(12) United States Patent
Chang et al.

(10) Patent No.: US 11,175,853 B2
(45) Date of Patent: Nov. 16, 2021

(54) SYSTEMS AND METHODS FOR WRITE AND FLUSH SUPPORT IN HYBRID MEMORY

(71) Applicant: Samsung Electronics Co., Ltd., Suwon-si (KR)

(72) Inventors: Mu-Tien Chang, Santa Clara, CA (US); Dimin Niu, Sunnyvale, CA (US); Hongzhong Zheng, Los Gatos, CA (US); Heehyun Nam, San Jose, CA (US); Youngjin Cho, San Jose, CA (US); Sun-Young Lim, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 479 days.

(21) Appl. No.: 15/669,851

(22) Filed: Aug. 4, 2017

(65) Prior Publication Data
US 2018/0329651 A1    Nov. 15, 2018

Related U.S. Application Data

(60) Provisional application No. 62/503,835, filed on May 9, 2017.

(51) Int. Cl.
*G06F 3/00* (2006.01)
*G06F 12/00* (2006.01)
*G06F 3/06* (2006.01)
*G06F 12/0895* (2016.01)
*G06F 12/0868* (2016.01)
(Continued)

(52) U.S. Cl.
CPC .......... *G06F 3/0659* (2013.01); *G06F 3/0604* (2013.01); *G06F 3/0656* (2013.01); *G06F 3/0685* (2013.01); *G06F 12/0868* (2013.01); *G06F 12/0895* (2013.01); *G06F 13/16* (2013.01); *G06F 12/0292* (2013.01); *G06F 2212/1024* (2013.01);
(Continued)

(58) Field of Classification Search
CPC .. G06F 3/0659; G06F 3/0656; G06F 12/0868; G06F 12/0895; G06F 711/154
See application file for complete search history.

(56) References Cited

U.S. PATENT DOCUMENTS 8,700,840 B2    4/2014   Paley et al.
9,223,642 B2    12/2015  Yu et al.
(Continued)

*Primary Examiner* — Reginald G Bragdon
*Assistant Examiner* — Michael L Westbrook
(74) *Attorney, Agent, or Firm* — Lewis Roca Rothgerber Christie LLP

(57) ABSTRACT

A memory module includes a memory controller including: a host layer; a media layer coupled to a non-volatile memory; and a logic core coupled to the host layer, the media layer, and a volatile memory, the logic core storing a first write group table including a plurality of rows, and the logic core being configured to: receive a persistent write command including a cache line address and a write group identifier; receive data associated with the persistent write command; write the data to the volatile memory at the cache line address; store the cache line address in a selected buffer of a plurality of buffers in a second write group table, the selected buffer corresponding to the write group identifier; and update a row of the first write group table to identify locations of the selected buffer containing valid entries, the row corresponding to the write group identifier.

16 Claims, 14 Drawing Sheets

(51) Int. Cl.
  *G06F 13/16*    (2006.01)
  *G06F 12/02*    (2006.01)
(52) U.S. Cl.
  CPC .............. *G06F 2212/1048* (2013.01); *G06F 2212/214* (2013.01); *G06F 2212/313* (2013.01)

(56) References Cited

U.S. PATENT DOCUMENTS

| | | |
|---|---|---|
| 9,262,333 B2 | 2/2016 | Karamcheti et al. |
| 9,378,142 B2 | 6/2016 | Ramanujan et al. |
| 9,535,827 B2 | 1/2017 | Crossland et al. |
| 9,552,176 B2 | 1/2017 | Lee et al. |
| 2011/0055458 A1* | 3/2011 | Kuehne .............. G06F 12/0246 711/103 |
| 2014/0304475 A1 | 10/2014 | Ramanujan et al. |
| 2016/0011802 A1 | 1/2016 | Berke |
| 2016/0342487 A1 | 11/2016 | Ware et al. |
| 2017/0010817 A1 | 1/2017 | Lim et al. |
| 2017/0060706 A1 | 3/2017 | Kinoshita |

* cited by examiner

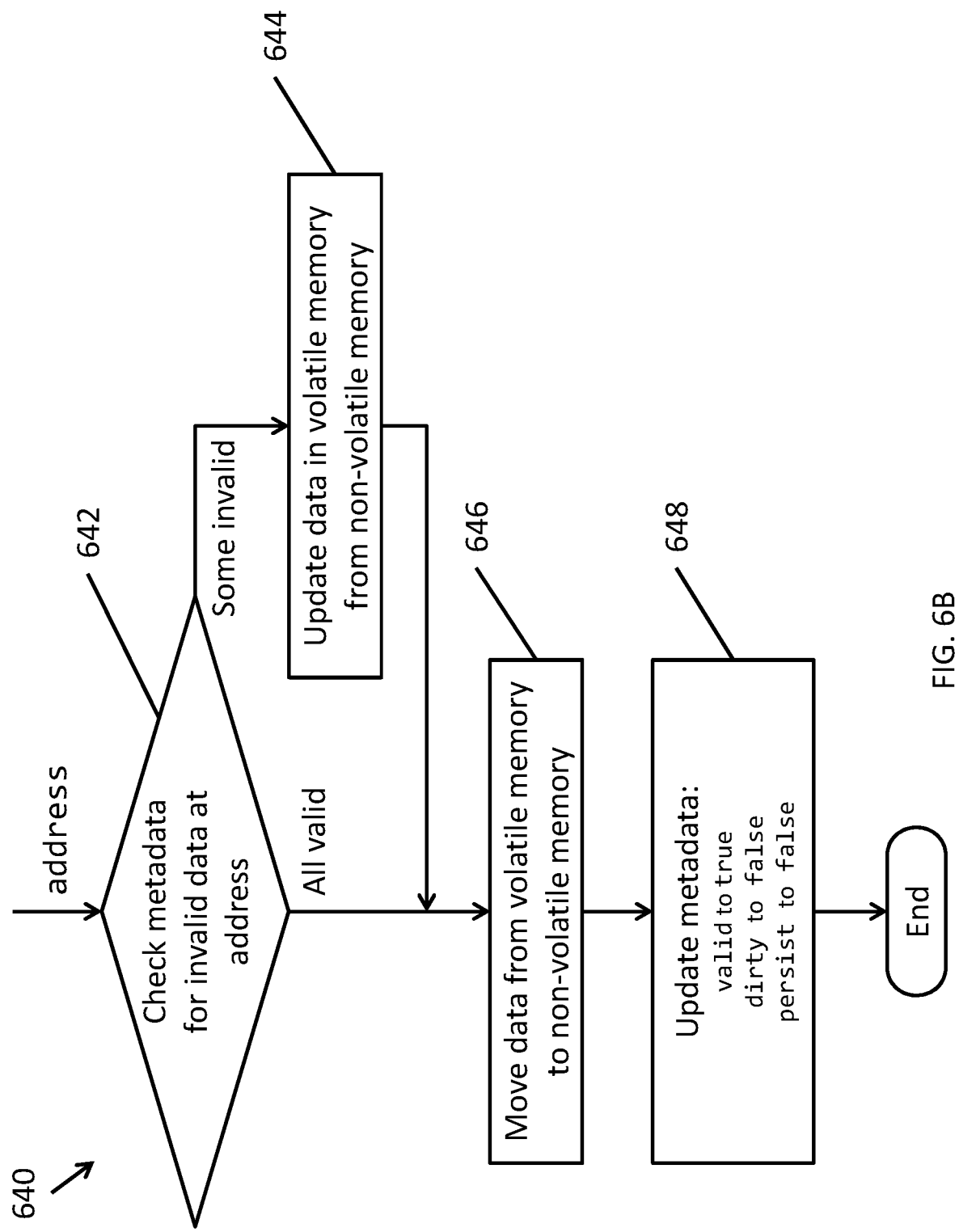

SYSTEMS AND METHODS FOR WRITE AND FLUSH SUPPORT IN HYBRID MEMORY

CROSS-REFERENCE TO RELATED APPLICATION(S)

This application claims the benefit of U.S. Provisional Patent Application Ser. No. 62/503,835, filed in the United States Patent and Trademark Office on May 9, 2017, the entire disclosure of which is incorporated herein by reference.

FIELD

Aspects of embodiments of the present invention relate to memory controllers for hybrid computer memory that includes volatile and non-volatile components, and methods of operating thereof.

BACKGROUND

Non-Volatile Dual In-line Memory Module with Persistent memory (NVDIMM-P) is a type of random-access memory for computer systems that may include a volatile portion that loses its contents when powered down and a non-volatile portion that retains its contents even when powered down (e.g., unexpected power loss, system crash, or standard shutdown). In some instances, NVDIMM-P may include memory mapped flash memory (e.g., NAND flash or ZNAND flash) as the non-volatile memory and dynamic random access memory (DRAM) as the volatile memory. In some instances, static random access memory (SRAM) may serve as the volatile portion, and/or phase-change memory (PCM) may serve as the non-volatile portion. Data stored in the NVDIMM-P module can be accessed either as "persistent DRAM" (e.g., byte addressable) or via block-oriented access similar to the manner in which computer systems access data on rotating media such as hard drives and optical drives, as well as data on a persistent storage device such as a solid state drive (SSD).

Standards for NVDIMM-P devices are defined by the JEDEC Solid State Technology Association (or JEDEC). These standards include a number of commands for accessing NVDIMM-P compliant devices.

SUMMARY

Aspects of embodiments of the present invention relate to memory controllers for Non-Volatile Dual In-line Memory Module with Persistent memory (NVDIMM-P) that include a volatile portion and a non-volatile portion. In particular, aspects of embodiments of the present invention relate to systems and methods for managing data written to the volatile and non-volatile portions of the NVDIMM-P in response to commands received from a host processor.

According to one embodiment of the present invention, a memory module includes: a volatile memory; a non-volatile memory; and a memory controller including: a host layer; a media layer coupled to the non-volatile memory; and a logic core coupled to the host layer, the media layer, and the volatile memory, the logic core storing a first write group table including a plurality of rows, and the logic core being configured to: receive, via the host layer, a persistent write command including a cache line address and a write group identifier; receive, via the host layer, data associated with the persistent write command; and in response to the persistent write command: write the data to the volatile memory at the cache line address; store the cache line address in a selected buffer of a plurality of buffers in a second write group table, the selected buffer corresponding to the write group identifier; and update a row of a plurality of rows the first write group table to identify locations of the selected buffer containing valid entries, the row corresponding to the write group identifier.

The logic core may further store a zeroth write group table including a plurality of rows, wherein each of the rows of the zeroth write group table may be associated with a corresponding write group, and wherein each of the rows of the zeroth write group table may include a row bitmap identifying rows of the first write group table and the second write group table associated with the corresponding write group.

The logic core may be further configured to: lookup, in the zeroth write group table, a corresponding row bitmap corresponding to the write group identifier, the corresponding row bitmap identifying buffers of the second write group table associated with the write group identifier; determine, based on the corresponding row bitmap, whether a buffer of the buffers associated with the write group identifier has available space; in response to determining that the buffer of the buffers has available space, select the buffer as the selected buffer; and in response to determining that none of the buffers associated with the write group identifier has available space, determine whether there is an available buffer in the second write group table; and in response to determining that there is an available buffer in the second write group table: update the corresponding row bitmap to associate the available buffer with the write group identifier; and select the available buffer as the selected buffer.

The persistent write command may further include a persist flag, and the logic core may further be configured to determine whether the persist flag is set, and, in response to determining that the persist flag is set: lookup one or more buffers in the second write group table associated with the write group identifier, each of the buffers storing one or more cache line address; and for each of the one or more cache line addresses of the one or more buffers associated with the write group identifier, write the data at the cache line address of the volatile memory to the non-volatile memory.

The memory module may further include cache metadata memory, wherein the logic core may be configured to store, in the cache metadata memory, a persist state for each cache line address stored in the second write group table.

The persistent write command may further include a persist flag, wherein the logic core may be further configured to determine whether the persist flag is set, and, in response to determining that the persist flag is set: lookup one or more buffers associated with the write group identifier, each of the buffers storing one or more cache line address; for each of the one or more cache line addresses of the one or more buffers associated with the write group identifier: determine whether the persist state corresponding to the cache line address is set; in response to determining that the persist state corresponding to the cache line address is set, write the data at the cache line address of the volatile memory to the non-volatile memory; and in response to determining that the persist state corresponding to the cache line address is not set, refrain from writing the data at the cache line address to the non-volatile memory.

The memory module may be a non-volatile dual in-line memory module.

According to one embodiment of the present invention, a memory module includes: a volatile memory; a non-volatile memory; and a memory controller including: a host layer; a media layer coupled to the non-volatile memory; and a logic core coupled to the host layer, the media layer, and the volatile memory, the logic core storing a first write group table including a plurality of rows, and the logic core being configured to: receive, via the host layer, a flush command including a write group identifier; lookup one or more rows of the first write group table corresponding to the write group identifier, each of the one or more rows including a head pointer and a tail pointer identifying valid entries in a corresponding buffer of a second write group table; lookup one or more buffers associated with the write group identifier in the second write group table, each of the one or more buffers storing one or more cache line address at the valid entries identified by the head pointer and the tail pointer of a corresponding row of the first write group table; and for each of the one or more cache line addresses of the one or more buffers associated with the write group identifier, write data at the cache line address of the volatile memory to the non-volatile memory.

The logic core may be further configured to update the head pointer and the tail pointer of the row of the first write group table corresponding to the write group identifier to the same value to empty the corresponding buffer.

According to one embodiment of the present invention, a memory module includes: a volatile memory; a non-volatile memory; and a memory controller including: a host layer; a media layer coupled to the non-volatile memory; and a logic core coupled to the host layer, the media layer, and the volatile memory, the logic core storing a first write group table including a plurality of rows, and the logic core being configured to: receive, via the host layer, a flush command; for each row of the first write group table: lookup a corresponding buffer in a second write group table, each row of the first write group table including a head pointer and a tail pointer identifying valid entries in the corresponding buffer of the second write group table; for each of the valid entries of the corresponding buffer, retrieve a corresponding cache line address and write data at the cache line address of the volatile memory to the non-volatile memory; and update the head pointer and the tail pointer of the row of the first write group table to the same value to empty the corresponding buffer.

According to one embodiment of the present invention, a method for operating a memory module including: a volatile memory; a non-volatile memory; and a memory controller including: a host layer; a media layer coupled to the non-volatile memory; and a logic core coupled to the host layer, the media layer, and the volatile memory, the logic core storing a first write group table including a plurality of rows, and the logic core being configured to control the volatile memory and the non-volatile memory, the method including: receiving, by the memory controller, a persistent write command including a cache line address and a write group identifier; receiving, by the memory controller, data associated with the persistent write command; and in response to the persistent write command: writing the data to the volatile memory at the cache line address; storing, by the memory controller, the cache line address in a selected buffer of a plurality of buffers in a second write group table, the selected buffer corresponding to the write group identifier; and updating, by the memory controller, a row of a plurality of rows the first write group table to identify locations of the selected buffer containing valid entries, the row corresponding to the write group identifier.

The logic core may further store a zeroth write group table including a plurality of rows, wherein each of the rows of the zeroth write group table is associated with a corresponding write group, and wherein each of the rows of the zeroth write group table including a row bitmap, the row bitmap identifying rows of the first write group table and the second write group table associated with the corresponding write group.

The method may further include: looking up, in the zeroth write group table, a corresponding row bitmap corresponding to the write group identifier, the corresponding row bitmap identifying buffers of the second write group table associated with the write group identifier; determining, based on the corresponding row bitmap, whether a buffer of the buffers associated with the write group identifier has available space; in response to determining that the buffer of the buffers has available space, selecting the buffer as the selected buffer; and in response to determining that none of the buffers has available space, determining whether there is an available buffer in the second write group table; and in response to determining that there is an available buffer in the second write group table, selecting the available buffer as the selected buffer.

The persistent write command may further include a persist flag, wherein the method may further include determining whether the persist flag is set, and, in response to determining that the persist flag is set: looking up one or more buffers in the second write group table associated with the write group identifier, each of the buffers storing one or more cache line address; and for each of the one or more cache line addresses of the one or more buffers associated with the write group identifier, writing the data at the cache line address of the volatile memory to the non-volatile memory.

The memory module may further include cache metadata memory, wherein the method may further include storing, in the cache metadata memory, a persist state for each cache line address stored in the second write group table.

The persistent write command may further include a persist flag, wherein the method may further include determining whether the persist flag is set, and, in response to determining that the persist flag is set: looking up one or more buffers associated with the write group identifier, each of the buffers storing one or more cache line address; for each of the one or more cache line addresses of the one or more buffers associated with the write group identifier: determining whether the persist state corresponding to the cache line address is set; in response to determining that the persist state corresponding to the cache line address is set, writing the data at the cache line address of the volatile memory to the non-volatile memory; and in response to determining that the persist state corresponding to the cache line address is not set, refraining from writing the data at the cache line address to the non-volatile memory.

The memory module may be a non-volatile dual in-line memory module.

According to one embodiment of the present invention, a method for operating a memory module including: a volatile memory; a non-volatile memory; and a memory controller including: a host layer; a media layer coupled to the non-volatile memory; and a logic core coupled to the host layer, the media layer, and the volatile memory, the logic core storing a first write group table including a plurality of rows, and the logic core being configured to control the volatile memory and the non-volatile memory, the method including: receiving, by the memory controller, a flush command, the flush command including a write group identifier; looking up one or more rows of the first write group table corresponding to the write group identifier, each of the one or more rows including a head pointer and a tail pointer identifying valid entries in a corresponding buffer of a second write group table; looking up one or more buffers associated with the write group identifier in the second write group table, each of the one or more buffers storing one or more cache line address at the valid entries identified by the head pointer and the tail pointer of a corresponding row of the first write group table; and for each of the one or more cache line addresses of the one or more buffers associated with the write group identifier, writing data at the cache line address of the volatile memory to the non-volatile memory.

The method may further include updating the head pointer and the tail pointer of the row of the first write group table corresponding to the write group identifier to the same value to empty the corresponding buffer.

According to one embodiment of the present invention, a method for operating a memory module including: a volatile memory; a non-volatile memory; and a memory controller including: a host layer; a media layer coupled to the non-volatile memory; and a logic core coupled to the host layer, the media layer, and the volatile memory, the logic core storing a first write group table including a plurality of rows, and the logic core being configured to control the volatile memory and the non-volatile memory, the method including: receiving, by the memory controller, a flush command; for each row of the first write group table: looking up a corresponding buffer in a second write group table, each row of the first write group table including a head pointer and a tail pointer identifying valid entries in the corresponding buffer of the second write group table; for each of the valid entries of the corresponding buffer, retrieving a corresponding cache line address and write data at the cache line address of the volatile memory to the non-volatile memory; and updating the head pointer and the tail pointer of the row of the first write group table to the same value to empty the corresponding buffer.

BRIEF DESCRIPTION OF THE DRAWINGS

The accompanying drawings, together with the specification, illustrate exemplary embodiments of the present invention and, together with the description, serve to explain aspects and principles of the present invention.

FIG. 6B is a flowchart of a "writeback" operation according to one embodiment of the present invention.

DETAILED DESCRIPTION

Figure 1:
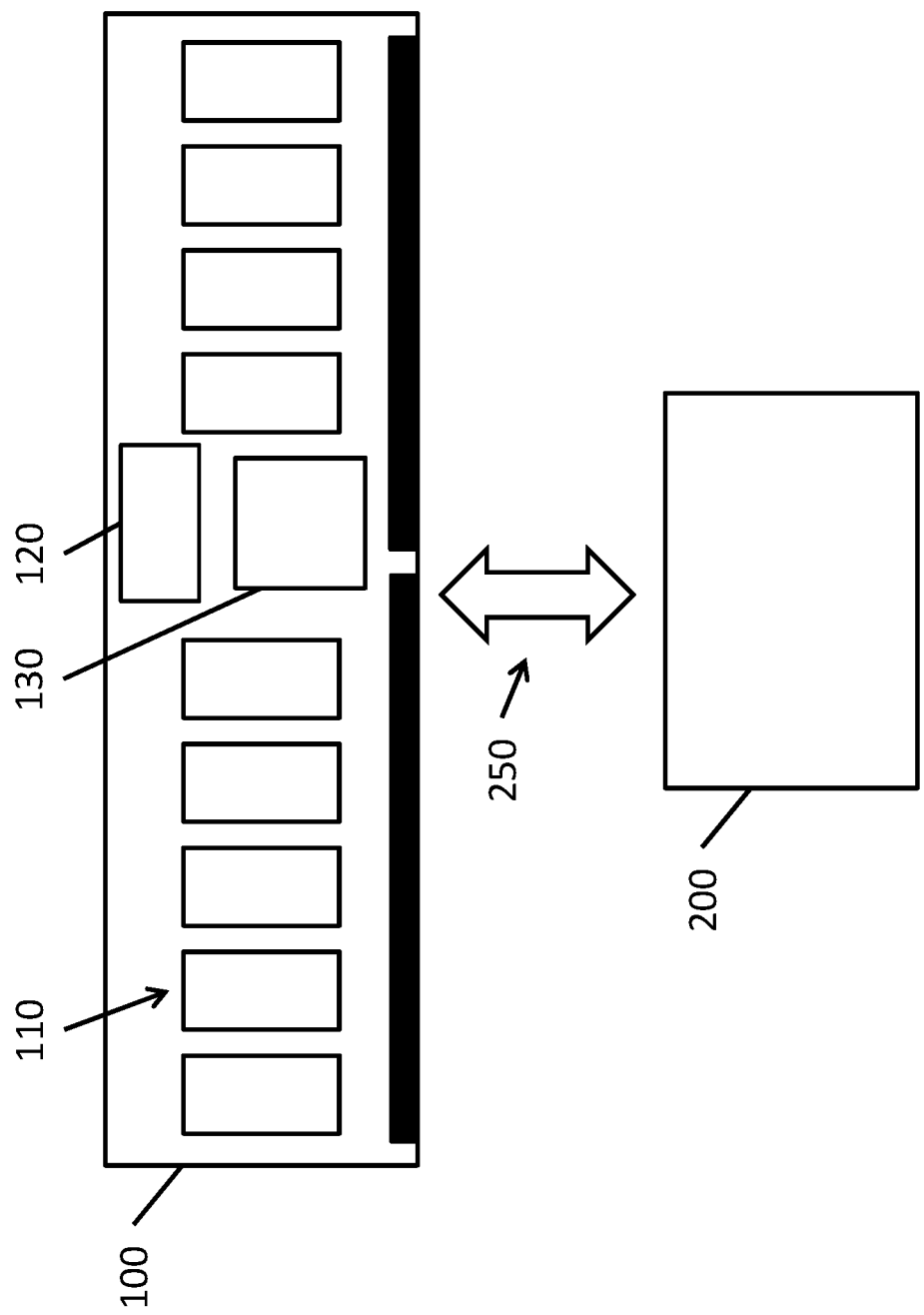
FIG. 1 is a schematic diagram of a non-volatile dual in-line memory module interfacing with a host system according to one embodiment of the present invention.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated.

It will be understood that, although the terms "zeroth", "first," "second," "third," etc., may be used herein to describe various elements, components, and/or sections, these elements, components, and/or sections should not be limited by these terms. These terms are used to distinguish one element, component, or section from another element, component, or section. Thus, a first element, component, or section described below could be termed a second element, component, or section, without departing from the spirit and scope of the present invention.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Figure 2A:
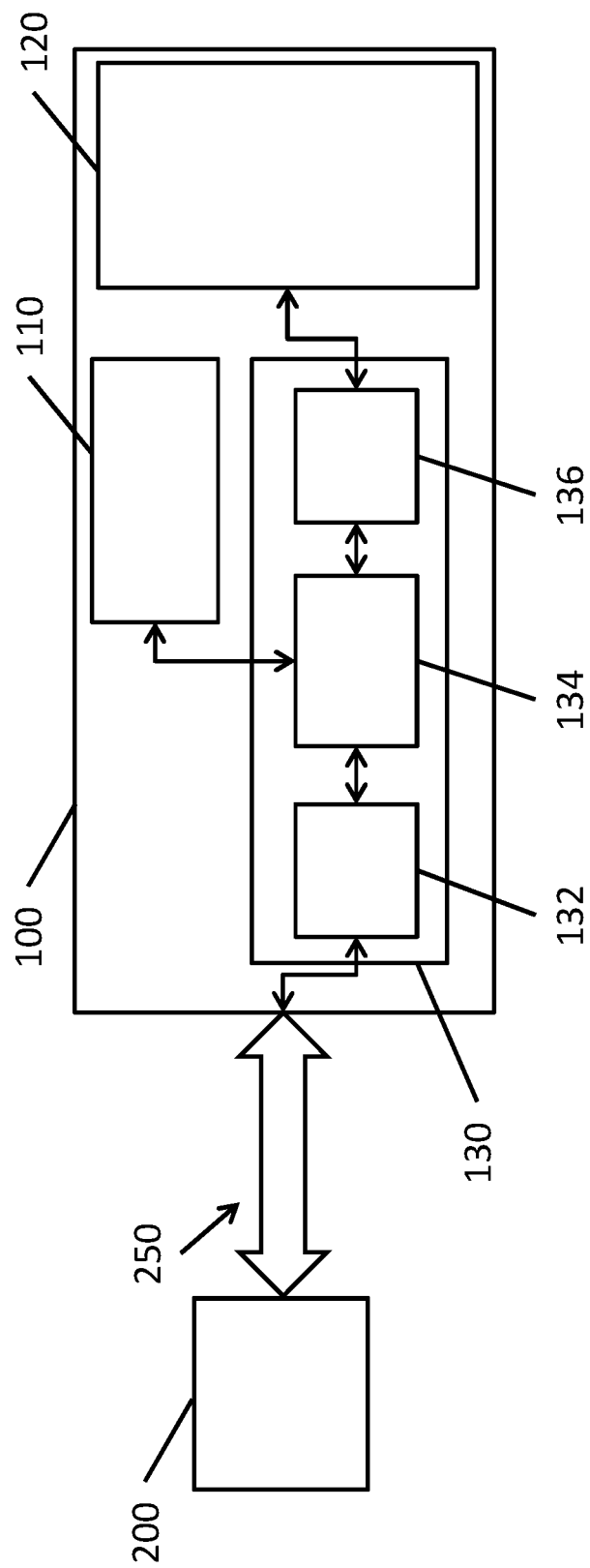
FIG. 2A is a block diagram of a non-volatile dual in-line memory module interfacing with a host system according to one embodiment of the present invention.

FIG. 1 is a schematic diagram of a non-volatile dual in-line memory module with persistent memory (NVDIMM-P) interfacing with a host system according to one embodiment of the present invention. FIG. 2A is a block diagram of a non-volatile dual in-line memory module with persistent memory interfacing with a host system according to one embodiment of the present invention.

As shown in FIGS. 1 and 2A, an NVDIMM-P 100 includes volatile memory 110, non-volatile memory (or persistent memory) 120, and a memory controller 130 configured to write and read data to and from both the volatile memory 110 and the non-volatile memory 120. The memory controller 130 may include a host layer 132 (e.g., a Row Address Strobe-Column Address Strobe, or RAS-CAS, interface) configured to interface with the host processor 200, a logic core 134 configured to control the NVDIMM-P module, and a media layer 136 configured to interface with the non-volatile memory 120. In some embodiments, the memory controller 130 may be implemented using, for example, a field programmable gate array (FPGA), an application specific integrated circuit (ASIC), or a microcontroller.

In the following discussion, the volatile memory 110 may be referred to as a "cache," and the logic core 134 may also be referred to as the "cache layer." For example, a static random access memory (SRAM) volatile memory 110 may serve as a write buffer for a phase change memory (PCM) non-volatile memory 120. As another example, a dynamic random access memory (DRAM) cache can be coupled with flash memory (e.g., Z-NAND) to improve performance when reading or writing frequently or recently used data.

Figure 2B:
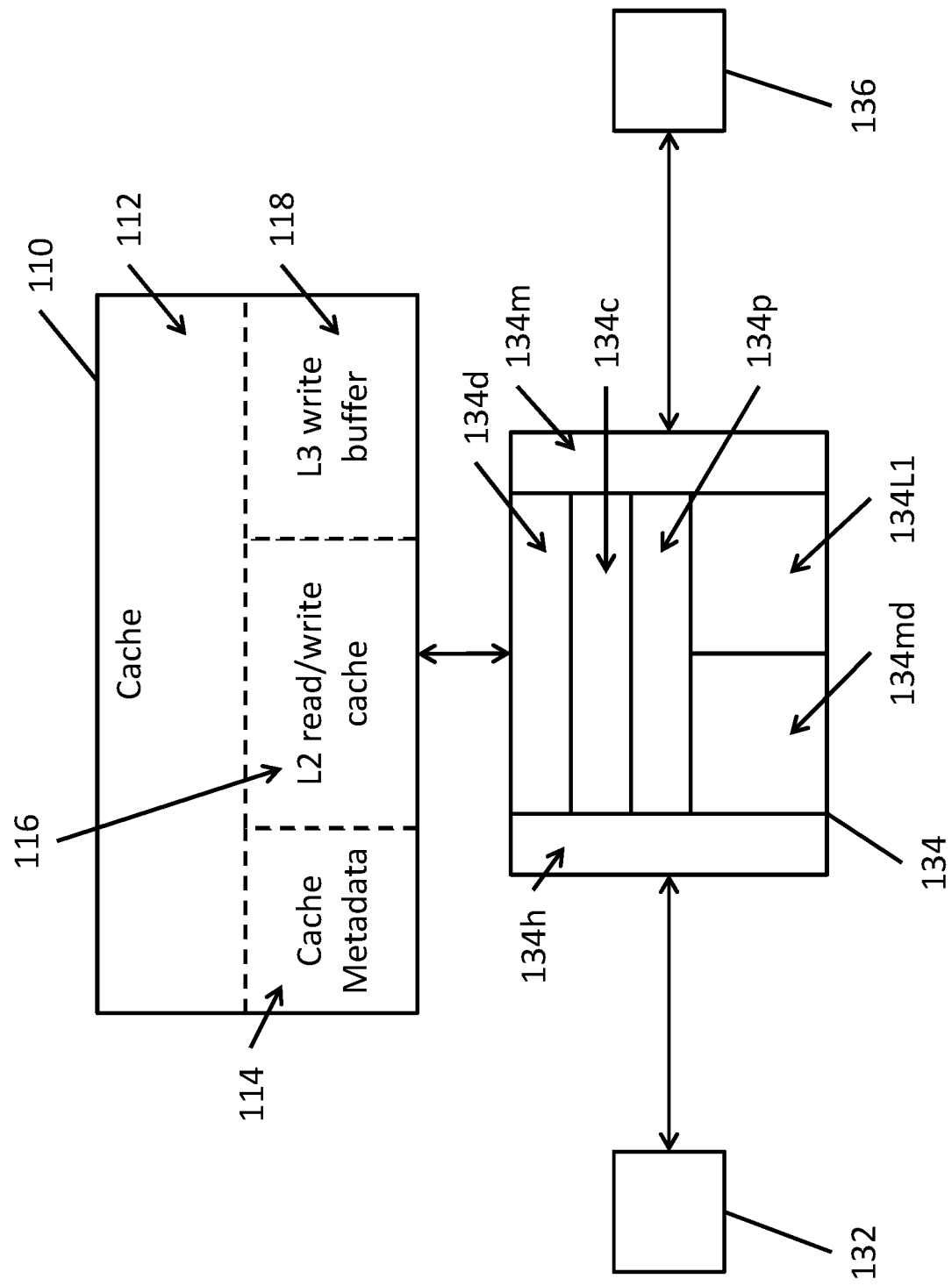
FIG. 2B is a block diagram of a portion of an NVDIMM-P, including a logic core and a volatile memory, according to one embodiment of the present invention.

FIG. 2B is a block diagram of a portion of an NVDIMM-P, including a logic core 134 and a volatile memory 110, according to one embodiment of the present invention. As shown in FIG. 2B, the logic core 134 includes an interface 134h to the host layer 132, an interface 134m to the media layer 136, a cache controller 134c, a prefetcher 134p, a metadata cache (which may be implemented as, or stored in, static random access memory or SRAM 134s within the logic core 134), an L1 prefetch buffer (which may be implemented stored in SRAM 134s within the logic core 134), and a volatile memory controller 134d configured to interface with the volatile memory 110 (e.g., dynamic random access memory or DRAM outside of the logic core 134).

FIG. 2B also illustrates various types of data that may be stored in the volatile memory 110, in one embodiment of the present invention. These data include cached data 112, cache metadata 114, an L2 read/write cache 116, and an L3 write buffer 118.

The NVDIMM-P 100, and in particular, the memory controller 130, may be configured to communicate with a host processor 200 via a bus 250 (see FIGS. 1 and 2A) coupled to the host layer 132 of the memory controller 130. The memory controller 130 may receive, via the host layer 132, commands and data from the host processor 200 to write and read the data to and from the NVDIMM-P. The memory controller 130 may respond to the commands by, for example, writing the data to the volatile memory 110 and/or the non-volatile memory 120, or reading data from the volatile memory 110 and/or the non-volatile memory 120 and providing the data to the host processor 200 via the bus 250. Data may be written and read to the NVDIMM-P 100 in units of cache lines over a cache line interface (e.g., memory mapped flash and DRAM) which may be accessed as "persistent DRAM" or may be accessed via a block-orient drive access interface.

Commands defined for the NVDIMM-P standard that relate to data persistency include a persistent write command (e.g., a PWRITE command in accordance with the NVDIMM-P standard) and a flush command (e.g., a FLUSH command in accordance with the NVDIMM-P standard). Parameters of the PWRITE command include a cache line address (or memory address) that the data is to be written to, a write group identifier (WGID), and a "persist" flag. In response to a PWRITE command with the "persist" flag set to "off" (e.g., zero or 0), the memory controller 130 stores the associated data in the volatile memory 110 of the NVDIMM-P 100, and there are no guarantees of the persistence of the data written by the command.

In response to a PWRITE command with the "persist" flag set to "on" (e.g., one or 1), then the memory controller 130 stores ("flushes") the associated data in the non-volatile memory 120 of the NVDIMM-P 100 and also stores (e.g., writes or flushes) all other data having the write group identifier WGID supplied in the PWRITE command from the volatile memory 110 into the non-volatile memory 120 (e.g., data previously written to the NVDIMM-P 100 using the PWRITE command and with the same WGID). The NVDIMM-P 100 may respond to the host processor 200 with a confirmation when the PWRITE command, with the persist flag set to "on," is completed.

Parameters of the FLUSH command can include a setting that indicates whether to: flush all writes (e.g., all data written to the volatile memory 110) to the non-volatile memory 120; flush all persistent writes (e.g., all writes made using the PWRITE command with the persist bit set to 0); or to flush all persistent writes associated with a given WGID (e.g., similar to a PWRITE command, but with no additional data). The NVDIMM-P 100 may provide a confirmation to the host processor 200 when the FLUSH operation is completed.

When flushing data in response to a PWRITE command with "persist" set to "on," or in response to a FLUSH command based on WGID, the memory controller 130 identifies the data in the volatile memory 110 that is to be flushed, in other words, all data associated with the given WGID.

If the volatile memory 110 is small, then the search for volatile data may be accomplished by scanning the entire volatile memory 110 for all of the data having a matching WGID. For example, an SRAM write buffer (e.g., L3 write buffer 118) may have about 256 cache entries, which, based on current memory technology, is sufficiently small to scan within a reasonable amount of time (e.g., without introducing significant latency or without significant performance overhead).

However, if the volatile memory 110 is large, then scanning all of the volatile data can become impractical. For example, an 8 gigabyte (GB) DRAM cache may have about 4 million cache line entries, and the time required to scan all 4 million cache line entries may be prohibitively long and may cause significant latency in the NVDIMM-P 100 (e.g., the memory controller 130 may block activity or wait, until the scan is complete, thereby increasing latency for performing subsequent commands that may be received and that may be waiting on a command queue of the memory controller 130).

As such, aspects of embodiments of the present invention are directed to systems and methods to reduce the overhead of identifying the entries of the volatile memory 110 to be flushed to non-volatile memory 120 in response to, for example, a PWRITE command with the persist bit set to 1 or a FLUSH command for a particular WGID. This significantly improves the response time of the NVDIMM-P 100, by reducing the time needed to flush write groups to non-volatile memory 120, which can improve throughput, such as by accelerating the flushing of data, which also reduces the blocking of subsequent commands on a command queue.

Some aspects of embodiments of the present invention relate to the use of a specialized data structure to track the state of data written to the volatile memory 110. Another aspect of embodiments of the present invention relates to systems and methods that utilize the data stored in the data structure to support the PWRITE and FLUSH commands with significantly reduced computational overhead, thereby allowing efficient implementation of NVDIMM-P commands such as PWRITE and FLUSH.

Figure 3A:
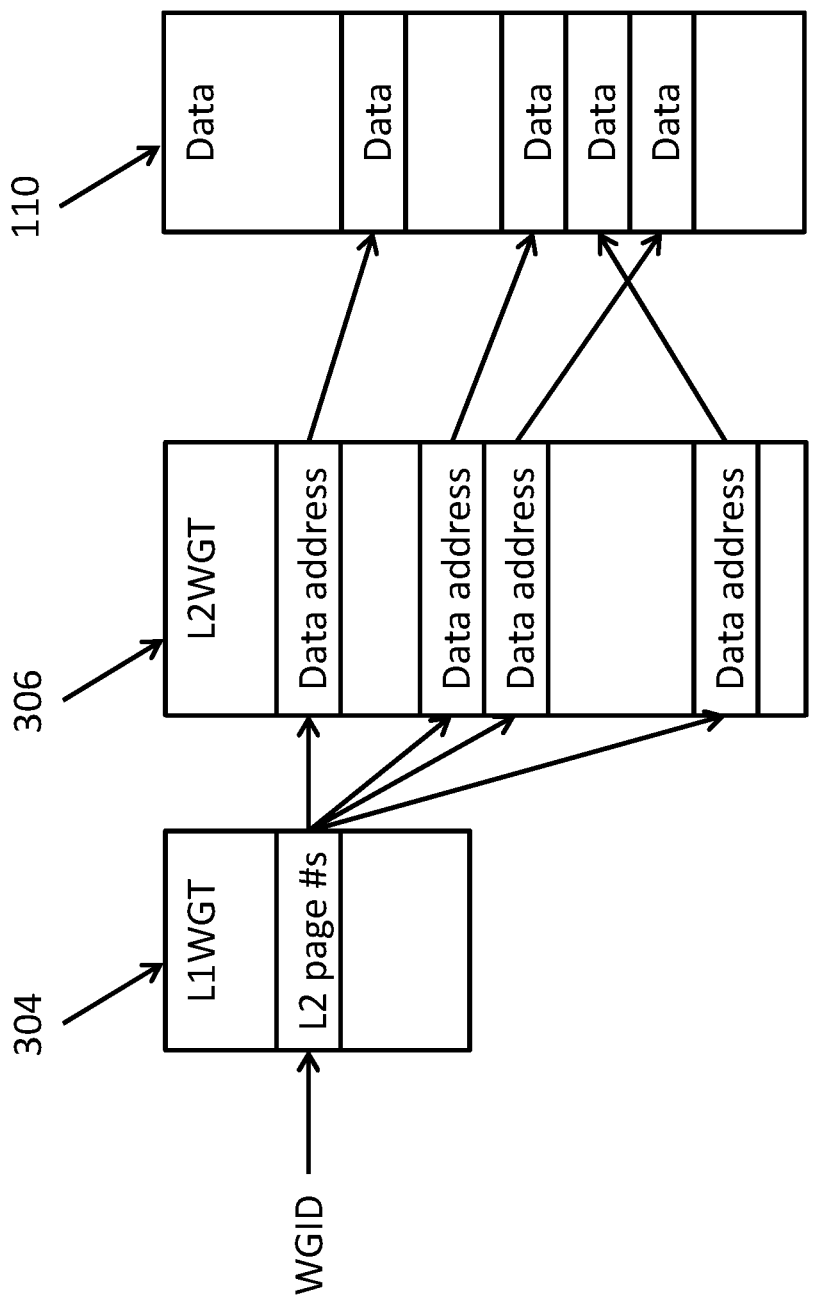
FIGS. 3A and 3B are schematic illustrations of a first write group table and a second write group table according to one embodiment of the present invention.
Figure 3B:
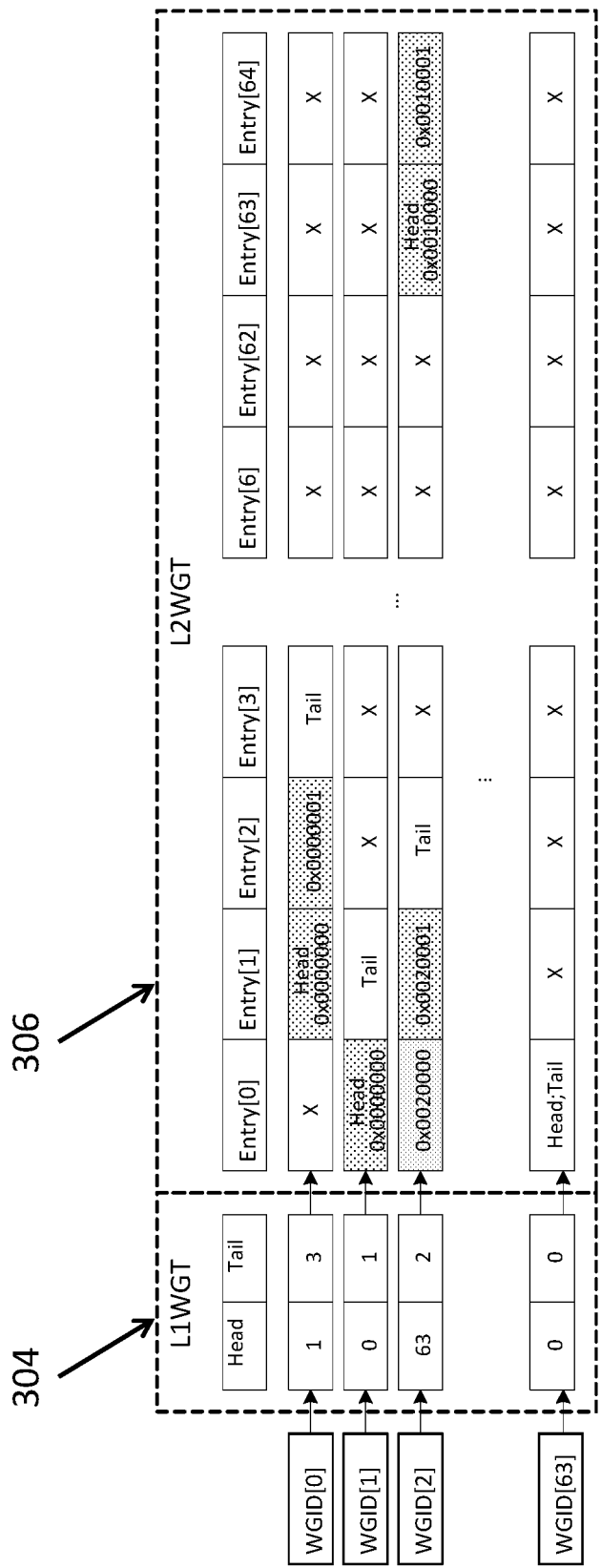

In one embodiment of the present invention, the data structure includes a first write group table (L1WGT) and a second write group table (L2WGT). FIGS. 3A and 3B are schematic illustrations of a first write group table L1WGT 304 and a second write group table L2WGT 306 according to one embodiment of the present invention. As shown in FIGS. 3A and 3B, the data structure is used to track cache lines that belong to each WGID, thereby simplifying the identification of which cache lines are associated with any given WGID.

The first write group table (L1WGT) may be stored in static random access memory (SRAM) 134s within the memory controller 130, and maps from a WGID (e.g., a 64 bit value) to a page entry (e.g., a bit map of entries in the second write group table L2WGT). The first write group table L1WGT may be based on SRAM for faster access, although embodiments of the present invention are not limited thereto. The second write group table (L2WGT) may be stored in the volatile memory 110 of the NVDIMM-P 100 (or in a separate dynamic memory (DRAM) of the memory controller 130), such as in the L2 read/write cache 116, and maps from a page entry to a cache line address (or data address) within the volatile memory 110 of the NVDIMM-P 100. In some embodiments, the second write group table L2WGT is stored in static memory SRAM, based on cost considerations, performance requirements, and capacity requirements (e.g., SRAM being faster and more expensive than DRAM, and the amount of memory being available within, for example, an FPGA or an ASIC being limited). In some embodiments of the present invention, there is an additional level of indirection, where the second write group table L2WGT maps to memory addresses or locations within a cache metadata region 114 of the volatile memory 110, and the cache metadata region 114 stores the cache line addresses.

FIG. 3B is a more detailed schematic illustration of the first write group table L1WGT and the second write group table L2WGT according to one embodiment of the present invention. In the example shown in FIG. 3B, the first write group table L1WGT includes 64 entries, one for each write group identifier numbered from 0 to 63 (WGID[0], WGID[1], . . . , WGID[63]). Each entry in the first write group table L1WGT of FIG. 3B corresponds to one of the rows of the second write group table L2WGT and includes a pointer to a head entry (a head pointer) and a pointer for a tail entry (a tail pointer) within the corresponding row of the second write group table L2WGT (e.g., each entry of the first write group table L1WGT may include an implicit offset corresponding to the memory location of the Entry[0] of the corresponding row of the second write group table L2WGT and the specific locations of the head and tail may be calculated with pointer arithmetic).

As noted above the second write group table L2WGT may be stored in SRAM or DRAM, based on performance requirements such as speed and capacity. In some embodiments, the second write group table L2WGT includes multiple ring buffers, with one ring buffer associated with a corresponding write group. In the example shown in FIG. 3B, there are 64 ring buffers, each corresponding to a different one of the 64 write groups labeled WGID[0] through WGID[63]. Each ring buffer includes multiple entries (in the embodiment shown in FIG. 3B, each ring buffer includes 65 entries: Entry[0] through Entry[64]), where each entry stores a cache line address (e.g., a 28 bit address). In the embodiment shown, valid entries are bounded by a head and a tail (e.g., entries outside of the range from head to tail−1 are considered to be invalid).

Considering, for example, the third write group WGID[0] shown in FIG. 3B, the first write group table L1WGT stores a head pointer of 1 and a tail pointer of 3, indicating that the entries in the ring buffer start at Entry[1] and end at entry [3]. Considering the corresponding row of the second write group table L2WGT, the head entry at Entry[1] stores the cache line address 0x0000000, the following entry at Entry[2] stores the cache line address 0x0000001 and the following entry at Entry[3] is the tail of the ring buffer.

In another embodiment of the present invention, the second write group table L2WGT may be implemented using an array, where the head entry is always the zeroth element (e.g., Entry[0]) and the first write group table L1WGT stores only the location of the tail.

While aspects of the present invention are described with respect to embodiments that include 64 write groups (e.g., 64 WGIDs), embodiments of the present invention are not limited thereto and may be implemented with fewer than 64 write groups or more than 64 write groups. For example, some embodiments of the present invention may include 255 write groups or 256 write groups.

Storing Information about the States of Entries

If a host processor 200 transmits a command to NVDIMM-P 100 to flush a cache line from volatile memory 110 to non-volatile memory 120, but the NVDIMM-P 100 has already written that cache line to non-volatile memory 120 without informing the host processor 200 (e.g., due to cache eviction when the cache is full), then flushing that cache line may be redundant. While this may not cause an incorrect result, the extraneous operation may hurt performance and the extraneous write may reduce the lifetime of the non-volatile memory 120 (e.g., needlessly consuming the limited number of write cycles of flash memory). As such, in some embodiments of the present invention, the memory controller 130 stores additional metadata for determining whether the additional write is needed, and this data allows the memory controller 130 to identify data that is already written to non-volatile memory 120, thereby allowing the memory controller 130 to avoid performing unnecessary writes to non-volatile memory 120, and thereby increase the lifetime of the non-volatile memory 120.

In some embodiments of the present invention, the memory controller 130 stores a "persist state" for each entry in the cache metadata 114 of the volatile memory 110. The persist state indicates that the corresponding cache line has been marked as persistent (e.g., by a PWRITE command), but has not yet been made persistent (e.g., by flushing it to the non-volatile memory 120). This corresponds to, for example, data written by a PWRITE command where persist is set to 0.

Table 1 illustrates the various possible states of data stored in the volatile memory 110 and whether or not the memory controller 130 writes the data from the volatile memory 110 into the non-volatile memory 120 (perform a writeback) in response to a cache eviction (not triggered by a PWRITE or FLUSH command) and in response to PWRITE or FLUSH commands.

TABLE 1

| State | Evict (not by PWRITE/FLUSH) | PWRITE/FLUSH |
| --- | --- | --- |
| Invalid | No writeback | No writeback |
| Clean | No writeback | No writeback |
| Dirty | Writeback to NVM | No writeback |
| Persist | Writeback to NVM | Writeback to NVM |

As seen in Table 1, when the state of the cache line is "invalid," there is no writeback to the non-volatile memory 120 in response to an eviction or a PWRITE or FLUSH because there is no need for the memory controller 130 to write invalid data to the non-volatile memory 120.

When the state is "clean," then the data in the volatile memory 110 is consistent with (e.g., the same as) the corresponding data in the non-volatile memory 120. As such, there, again, is no need for the memory controller 130 to writeback the data from volatile memory 110 to the non-volatile memory 120.

When the state is "dirty," then the data in the volatile memory 110 has changed and is inconsistent with the non-volatile memory 120. As such, when this data is evicted from the cache (the volatile memory 110), the memory controller 130 writes the data to the non-volatile memory 120 in order to avoid data loss. However, because this data was not marked as persistent, there is no writeback of the data in response to a PWRITE or FLUSH command.

When the state is "persist," the data is written to the non-volatile memory 120 in both the case of a cache eviction (because otherwise the persisted data would be lost) and in the case of a PWRITE or FLUSH command. After data that has been marked as persistent has been written to non-volatile memory 120, the data may be set to a "clean" state in the metadata such that a subsequent PWRITE or FLUSH command does not cause that data to be written back again.

Because there are four different states shown in Table 1 above, in some embodiments the memory controller 130 can track which of the four states (invalid, clean, dirty, persist) using, for example, three bits. Table 2 illustrates the encoding of the different states, and these states may be stored within cache metadata 114 for the L2 read/write cache 116 and the L3 write buffer 118, according to one embodiment of the present invention:

TABLE 2

| | Read/write cache (RWC) | | | write buffer (WB) | | |
| --- | --- | --- | --- | --- | --- | --- |
| State | Valid bit | Dirty bit | Persist bit | Valid bits [32] | Dirty bit | Persist bit |
| Invalid | 0 | X | X | All 0 | X | X |
| Clean | 1 | 0 | 0 | All 1 | 0 | 0 |
| Dirty (dirty but not persist) | 1 | 1 | 0 | Not all 0 | 1 | 0 |
| Persist (dirty and persist) | 1 | 1 | 1 | Not all 0 | 1 | 1 |

As shown in Table 2, above, the four states can be represented using a combination of one or more "valid" bits, a "dirty" bit, and a "persist" bit. For example, in the case of a read/write cache (RWC) a single valid bit, a single dirty bit [valid, dirty], and a single persist bit can represent the four states: [0, X, X] indicates an "invalid" state (where "X" indicates that the value can be ignored, e.g., a 0 or 1, in other words, the valid bit being 0 is sufficient to establish that the state is "invalid"), [1, 0, 0] indicates a "clean" state, [1, 1, 0] indicates a "dirty" but not "persist" state, and [0, 1, 1] indicates a "persist" or "dirty and persist" state.

Similarly, in the case of a write buffer (WB), the state can be inferred from multiple valid bits (e.g., 32 bits), a dirty bit, and a persist bit. When all of the valid bits are 0, then the data are in the "invalid" state. When all of the valid bits are 1, the dirty bit is 0, and the persist bit is 0, then the data are in the "clean" state. When not all of the valid bits are 0, the dirty bit is 1, and the persist bit is 0, then the data are in the "dirty" state, and when not all of the valid bits are 0, the dirty bit is 1, and the persist bit is 1, then the data are in the "persist" state.

As noted above, after the data is evicted from the cache, the state of the data maybe transitioned to clean, e.g., by modifying the values of the metadata as appropriate. For example, in the case of the read/write cache 116, after performing an eviction of data from the "persist" state, the values of the metadata may be changed from [0, 1, 1] (the "persist" state) to [1, 0, 0] (the "clean" state).

Implementing PWRITE and FLUSH Using Four Functions

Aspects of embodiments of the present invention are directed to four functions that can be used, in conjunction with the write group tables and the cache line metadata, to support an implementation of the PWRITE and FLUSH commands. These functions include:

record(wgid, address)—to record a cache line address in the write group table.

flush(wgid)—to flush cache lines that are associated with a particular WGID flushPersist( )—to flush all persistent cache lines (e.g., cache lines with "persist state" set)

flushAll( )—to flush all cache lines (e.g., whether persistent or not).

Figure 4:
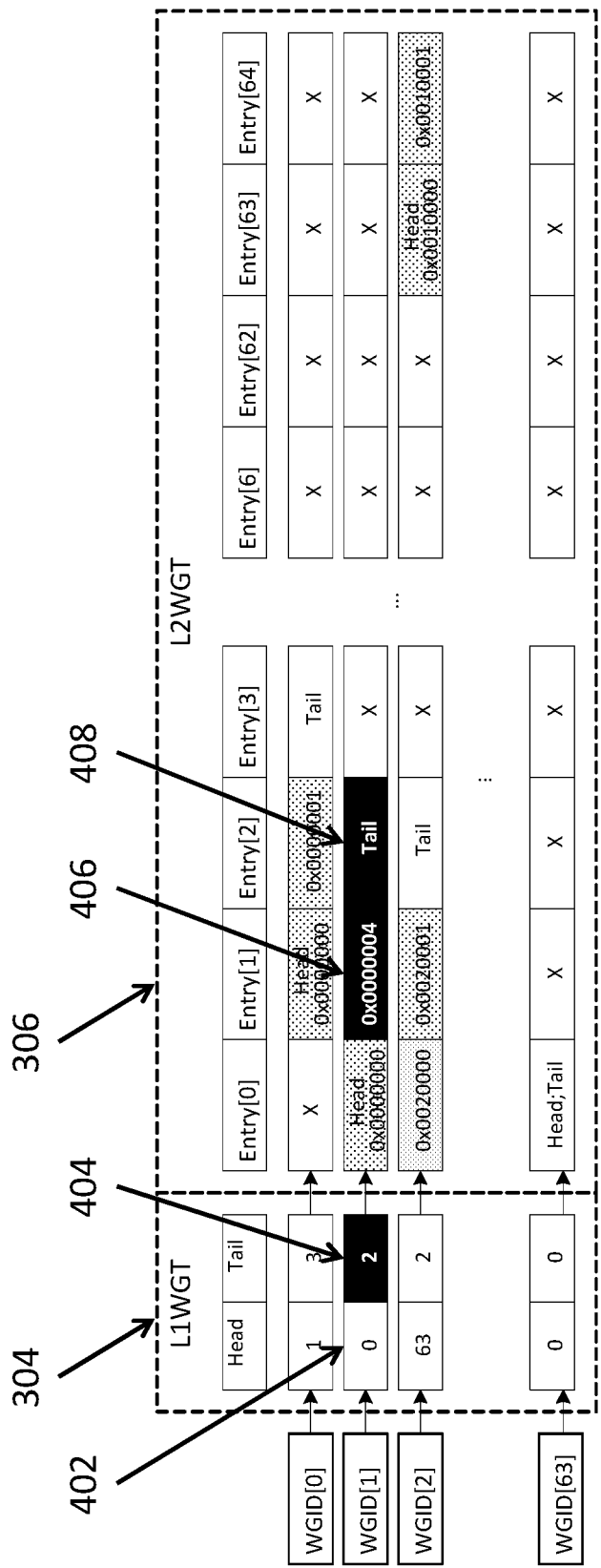
FIG. 4 is a schematic illustration of the effect of a "record" operation on a first write group table and a second write group table according to one embodiment of the present invention.

FIG. 4 is a schematic illustration of the effect of a "record" operation on a first write group table and a second write group table according to one embodiment of the present invention. In particular, FIG. 4 depicts the effect of calling the function record(wgid, address) with the parameters WGID[1] for wgid and 0x0000004 for the address (cache line address). Portions of the write group table that have changed in comparison to the state shown in FIG. 3B are depicted with a dark or black background.

Figure 5:
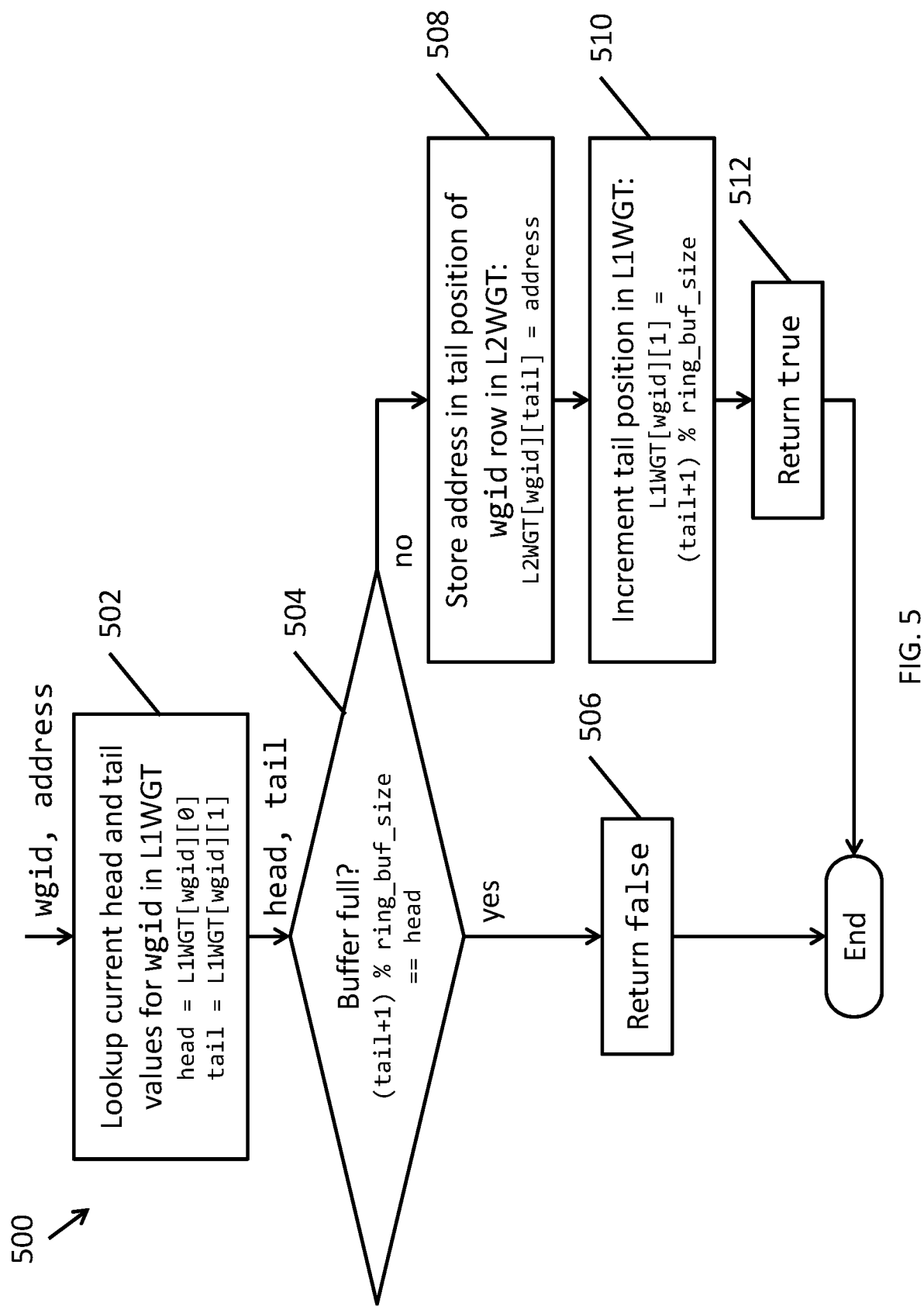
FIG. 5 is a flowchart of a "record" operation according to one embodiment of the present invention.

FIG. 5 is a flowchart of a "record" operation 500 according to one embodiment of the present invention. FIG. 5 also includes lines of C-like pseudocode indicating how the various operations may be performed.

Referring to FIGS. 4 and 5, the record operation is called with a write group ID wgid and a cache line address. In operation 502, the memory controller looks up the head and tail values corresponding to the given wgid from the first write group table L1WGT. In the example shown in FIG. 4, the head for WGID[1] is stored in position 402 of the L1WGT, and the tail is stored in position 404 of the L1WGT. Referring back to FIG. 3B, for WGID[1], the head was 0 and the tail was originally 1.

In operation 504, the memory controller 130 determines if the buffer associated with the given write group ID is full. For example, the ring buffer may be determined to be full if the position of the tail is one position before the position of the head (and may be computed by (tail+1) % ring_buf_size==head).

If the buffer is full, then the memory controller 130 may return false in operation 506, indicating that the record operation failed and the record operation ends.

If the buffer is not full, then in operation 508 the memory controller 130 stores the given address in the tail position of the row of the second write group table L2WGT that corresponds to the given write group. In pseudocode, this may be L2WGT[wgid][tail]=address, and in the example shown in FIG. 4, this corresponds to writing the address 0x0000004 into the location 406 corresponding to the tail (Entry[1]) in the row of the second write group table L2WGT corresponding to WGID[1].

In operation 510, the memory controller 130 increments the position of the tail in the first write group table L1WGT. As such, the tail, shown at location 404 in FIG. 4, is incremented from 1 to 2, and correspondingly, the tail is now located at Entry[2], shown as location 408 in FIG. 4.

In operation 512, the memory controller 130 returns true, indicating that the record operation succeeded, and the record operation ends.

Figure 6A:
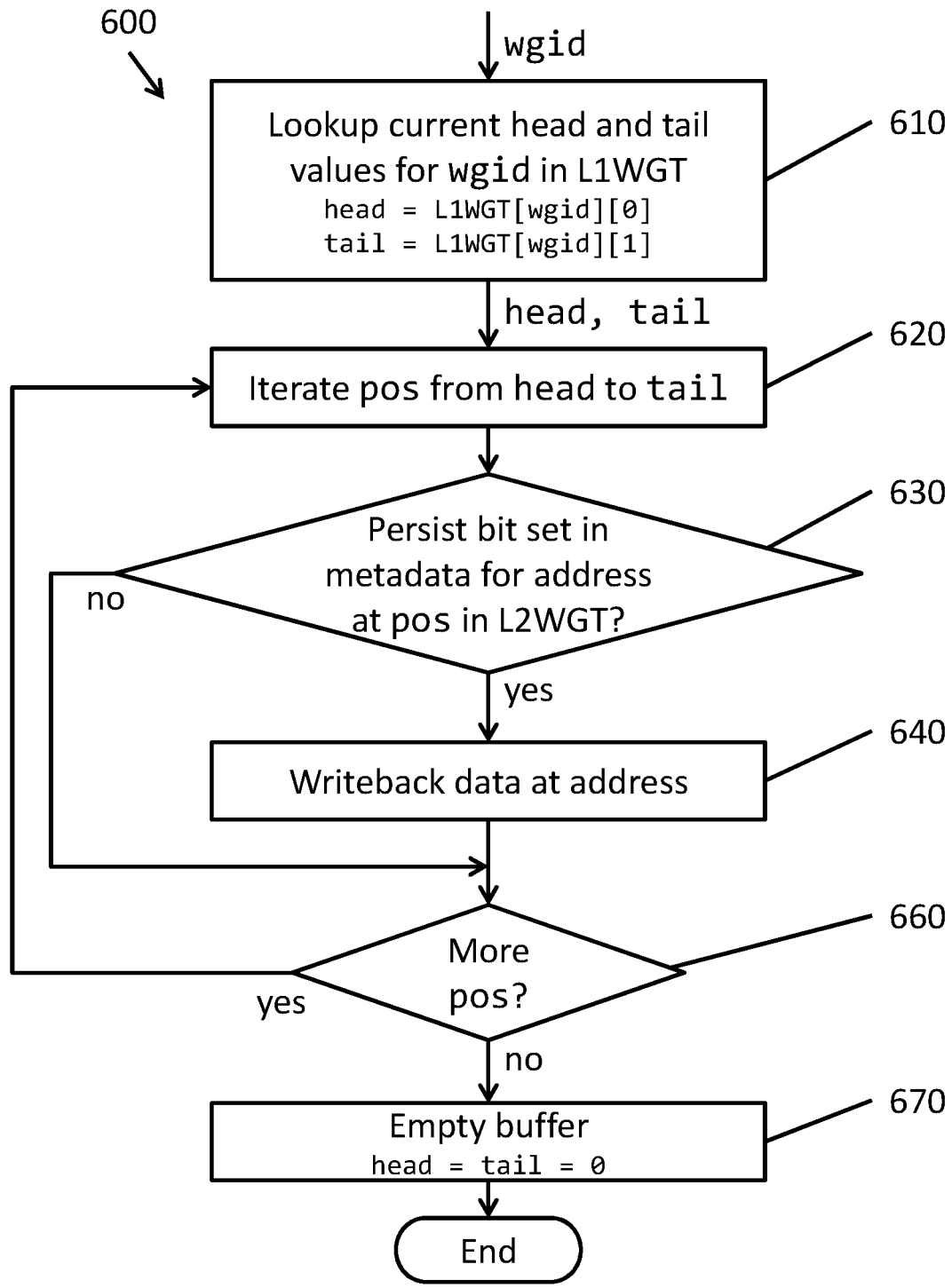
FIG. 6A is a flowchart of a "flush" operation according to one embodiment of the present invention.

FIG. 6A is a flowchart of a "flush" operation 600 according to one embodiment of the present invention. As shown in FIG. 6A, the "flush" function may take a write group ID wgid as input and flushes all of the cache lines associated with the wgid using a writeback operation, then clears the buffer. More specifically, in one embodiment, in operation 610, the memory controller 130 looks up the head and tail values in the first write group table L1WGT for the given wgid. In operation 620, the memory controller 130 begins a loop to iterate over the values from head to tail, where the current position in the loop is indicated by "pos." As noted above, in some embodiments, the buffer may be implemented as a ring buffer, where the tail position may be indicated by a value less than the head. In such a case, the iteration in operation 610 may take this into account in order to iterate over all valid values within the buffer.

In operation 630, the memory controller 130 determines whether the persist state is set in the metadata for the address at the current position pos of the buffer. If so, then in operation 640 the memory controller 130 writes the data at the address to non-volatile memory 120 (performs a writeback). If the persist state is not set (e.g., false), then the memory controller 130 refrains from writing the data at the address to the non-volatile memory 120 (e.g., because the data is already stored in the non-volatile memory 120). In either case, in operation 660, the memory controller determines if there are more positions of the buffer to evaluate (e.g., if pos is less than tail). If so, then the memory controller continues to operation 620 to identify the next position from head to tail. If all of the positions have been evaluated, then in operation 670 the memory controller empties the buffer by setting head and tail to the same value (e.g., setting the values of the head and tail in the row of the first write group table L1WGT corresponding to the given write group ID wgid to 0).

Because the write group table stores the memory locations of all data that is associated with each write group ID, the memory controller 130 does not need to scan the entire volatile memory 110 to identify which data belongs to a given write group. Instead, identifying all of the data associated with a given write group merely involves looking up the collection of addresses stored in the write group table in association with the write group.

FIG. 6B is a flowchart of a "writeback" operation 640 according to one embodiment of the present invention. Given a cache line address, the memory controller 130 performs the writeback of the data associated with the cache line address by identifying the data, writing the identified data to the non-volatile memory 120, and updating the metadata in accordance with the modified status of the data. Although not shown in FIG. 6B, in some embodiments of the present invention, the cache line address is converted to a metadata address, where metadata located at the metadata address may identify the metadata states (or "bits") associated with the cache line (e.g., one or more valid states, dirty state, and persist state) as well as an identification of the corresponding location of the data in volatile memory 110 and the corresponding location in non-volatile memory 120, if applicable.

In operation 642, the memory controller 130 checks the metadata to determine if there is any invalid data at the address (e.g., whether any of the one or more valid bits is set to false). If so, then the data in the volatile memory 110 is updated with data from the non-volatile memory 120 in operation 644. In either case, in operation 646, the memory controller 130 moves the data at the address from volatile memory 110 to non-volatile memory 120, and in operation 648 the memory controller 130 updates the metadata to set the valid states to true (e.g., all 1), the dirty state to false (e.g., 0), and the persist state, if applicable, to false (e.g., 0).

Some embodiments of the present invention are directed to implementing the PWRITE and FLUSH commands based on the techniques and operations described above with respect to functions record(wgid, address) and flush(wgid), as described in more detail below.

Figure 7:
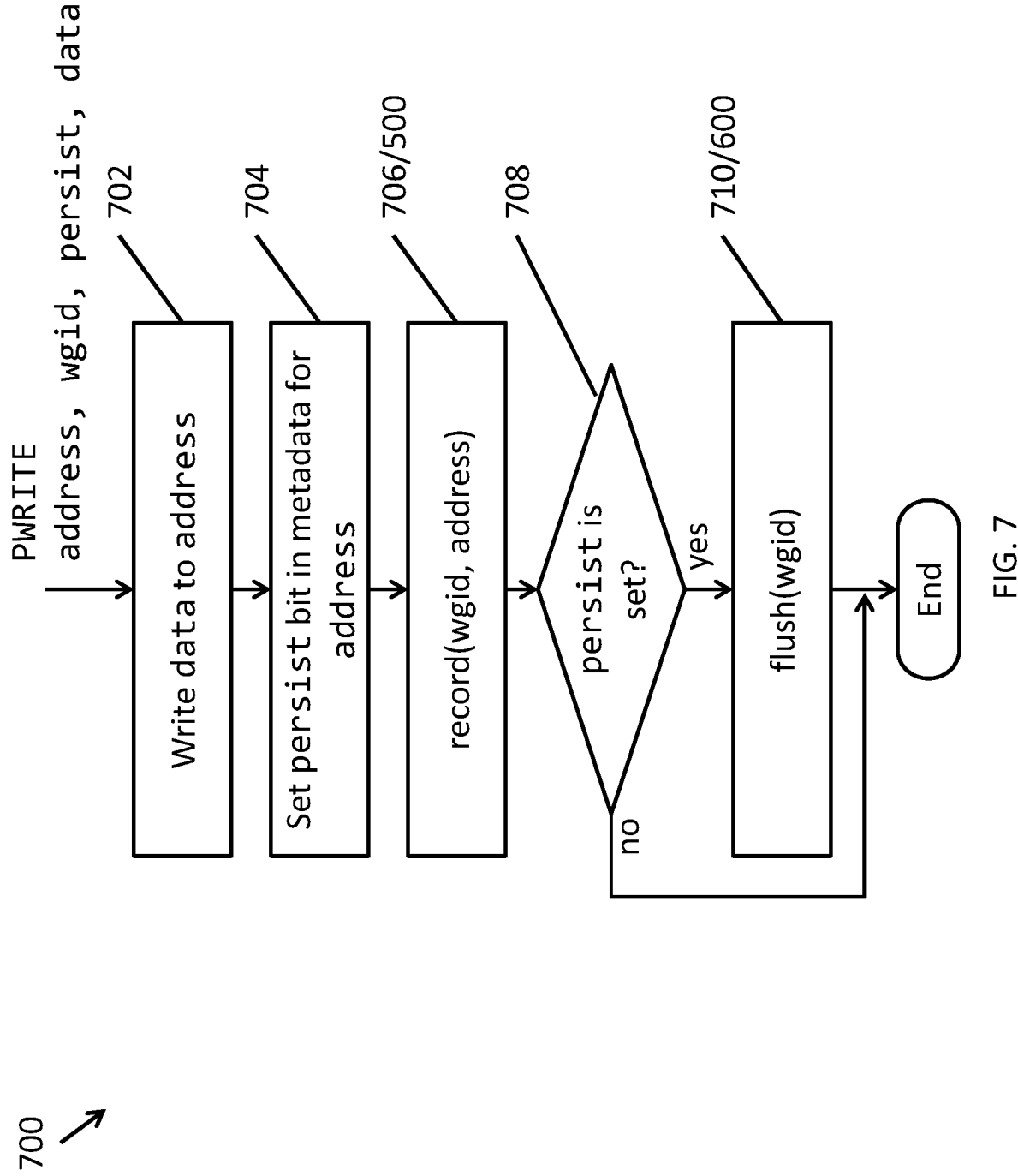
FIG. 7 is a flowchart of the implementation of a persistent write (PWRITE) command according to one embodiment of the present invention.

FIG. 7 is a flowchart of the implementation of a PWRITE command according to one embodiment of the present invention. When the memory controller 130 receives a PWRITE command, all operations are substantially the same as with a normal write (XWRITE), with the exception that the memory controller 130 also sets the given address to the "persist" state in the metadata and the record function is used to record the PWRITE into the write group table. In one embodiment, the PWRITE command includes a memory address, a PWRITE command includes an address, a write group ID (WGID), a persist flag, and some associated data. In operation 702 the memory controller 130 writes the data to the address (as with a normal XWRITE command). In operation 704, the memory controller 130 sets the metadata corresponding to the address to the persist state (e.g., by setting the persist state to true (e.g., 1) or, in the case of a read/write cache, by setting the valid and dirty states to 0 and 1, respectively, as shown in Table 2 above). In operation 706, the memory controller records the PWRITE into the write group table (e.g., L1WGT and L2WGT) using the record operation 500 described above with respect to FIG. 5. In operation 708, the memory controller 130 determines if the persist flag is set in the PWRITE command. If so, then in operation 710 the memory controller 130 uses the flush operation 600 described above with respect to FIG. 6A to flush all of the data associated with the given WGID to non-volatile memory 120. In either case, the command is complete (e.g., if the persist flag is not set in the PWRITE command, there is no need to perform the flush operation).

Figure 8:
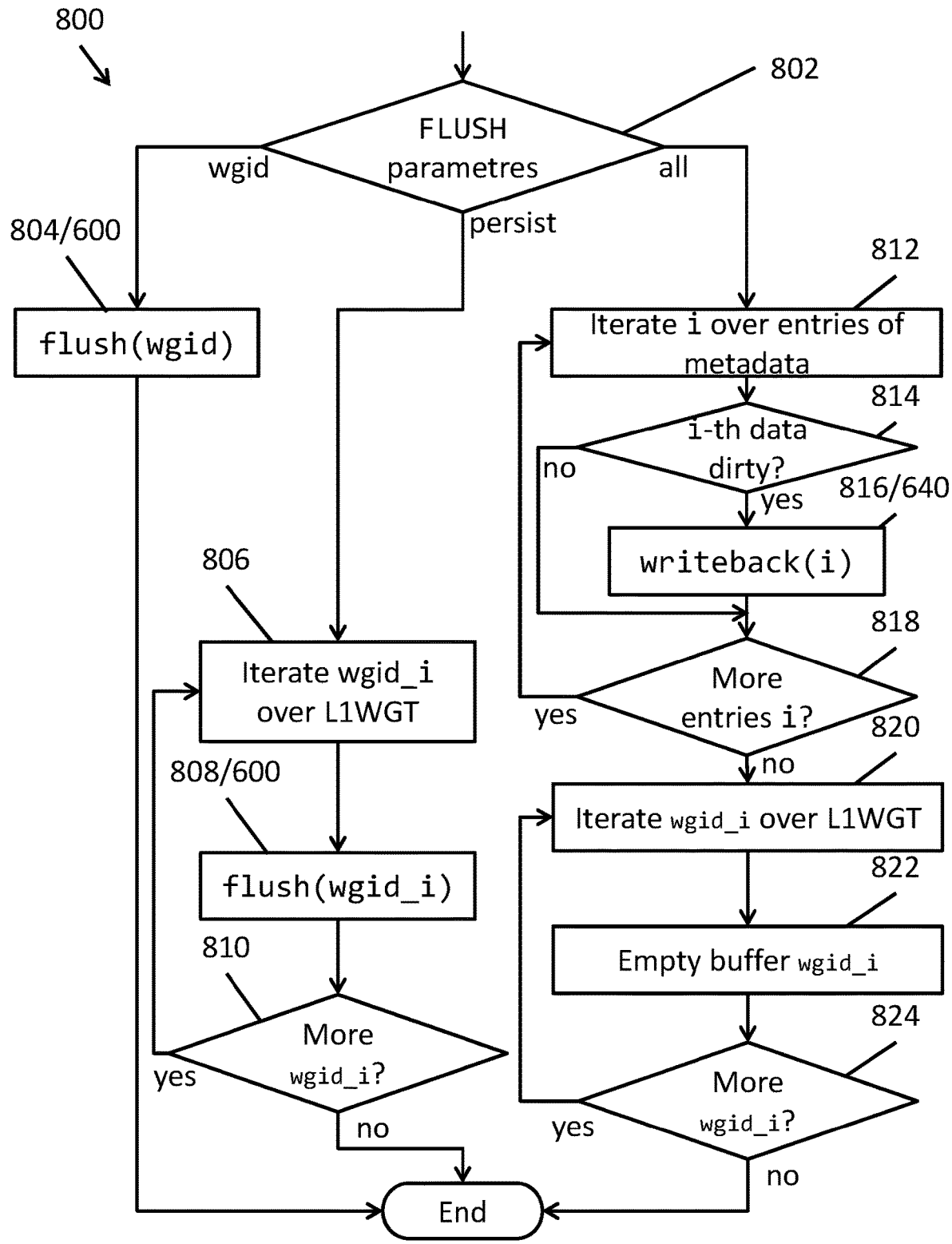
FIG. 8 is a flowchart of the implementation of a FLUSH command according to one embodiment of the present invention

FIG. 8 is a flowchart of the implementation of a FLUSH command according to one embodiment of the present invention. As shown in FIG. 8, depending on the parameters provided to the FLUSH command, the FLUSH command may flush all data associated with a particular write group ID (wgid), flush all data that has the persist state set (e.g., set to true), or flush all data in the volatile memory 110. In operation 802, the memory controller 130 determines, from its parameters, whether the FLUSH command is to flush a particular write group, flush all data marked with persist, or to flush all data in the volatile memory 110.

If the memory controller 130 determines that the FLUSH command is to flush a particular write group, then in operation 804, the memory controller flushes the specified write group using the flush function described above with respect to FIG. 6A then executing the FLUSH command is complete.

If the memory controller 130 determines that the FLUSH command is to flush data marked with persist, then the memory controller begins a loop to iterate over all write group IDs (wgid_i) in the write group table (e.g., in L1WGT). In operation 808, the memory controller 130 flushes the current write group (e.g., the current wgid_i) using the flush command described above with respect to FIG. 6A. In operation 810, the memory controller 130 determines if there are more write groups to process. If so, then the memory controller 130 loops with operation 806 to select the next write group. If there are no more write groups to process, then the executing the FLUSH command is complete.

If the memory controller 130 determines that the FLUSH command is to flush all data stored in volatile memory 110, then in operation 812, the memory controller 130 begins a loop to iterate over all of the volatile memory 110 by iterating over the entries in the metadata. For each entry in the metadata, the memory controller 130 determines, in operation 814, whether the corresponding data is dirty. If so, then in operation 816 the memory controller 130 performs the writeback operation 640 on the i-th data as described above in FIG. 6B. In operation 818, the memory controller 130 determines if there are more entries in the metadata to process. If so, then the memory controller 130 loops back to operation 812 to select the next entry. If there are no more entries to process (e.g., after processing all of the entries of the metadata) then in operation 820 the memory controller 130 begins a loop over the entries of the write group table to clear all of these entries (because all of the data has been flushed to non-volatile memory 120). In particular, in operation 822 the memory controller 130 empties the buffer for the current write group by, for example, setting the head and tail in L1WGT to the same value (e.g., setting both to 0). In operation 824, the memory controller 130 determines if there are more write groups to empty. If so, then the memory controller loops back to operation 820 to select the next write group. If there are no more entries (e.g., after emptying the buffers of all of the write groups) then the executing the FLUSH command is complete.

As such, aspects embodiments of the present invention enable the efficient implementation of the PWRITE and FLUSH commands of the JEDEC NVDIMM-P specification through the use of metadata that stores information about the persist state of data stored in the volatile memory 110 and a write group table that stores information about the cache line addresses associated with each write group, thereby accelerating and reducing the overhead of executing commands that involve the identification of data associated with a write group.

Some aspects of embodiments of the present invention relate to preventing race conditions that could cause the write group table to become inconsistent. In some embodiments, the memory controller 130 may be capable of processing multiple commands concurrently. However, if two writes are performed concurrently, the write group tables may be left in a state that is inconsistent with the actual data, depending on the particular order in which when various portions of the write operations were performed. Some such race conditions can be prevented by the memory controller 130 locking the volatile memory 110 (e.g., queues write commands) while it performs writeback operations 640. As such, in some embodiments of the present invention, while the memory controller 130 is performing a writeback operation 640 (e.g., as illustrated in FIG. 6B) to move data from volatile memory 110 to non-volatile memory 120 and update the metadata to indicate that the data has been moved to non-volatile memory 120, the memory controller delays all other write commands (e.g., XWRITE and PWRITE commands) until the writeback operation 640 is completed.

In one embodiment of the present invention, the memory controller 130 may continue to respond to other commands (e.g., read commands or other non-write commands) while performing the writeback operation 640. All commands received from the host processor 200 may be stored on the command queue of the memory controller 130 until they are performed. Under typical conditions, the memory controller 130 may execute the commands in the command buffer in a first-in, first-out (FIFO) manner, where the earliest commands are executed first. However, to implement the lock of the volatile memory during the writeback operation, the memory controller 130 may execute only non-write commands (e.g., read commands) from the command buffer during the writeback operation. After the writeback operation is completed, the memory controller 130 may executing any write commands in the command buffer that may have been passed over during the writeback operation.

Another aspect of embodiments of the present invention relates to pre-flushing (or garbage collecting) cache lines associated with a particular write group to non-volatile memory 120 when the buffer for the particular write group is full (e.g., when the row of the second write group table is full) or due to filling of the write group table due to fragmentation (e.g., many write groups are in use, but some write groups have many slots open in the second write group table L2WGT). For example, this can be triggered by executing the flush(wgid) when the buffer associated with the wgid is full. In more detail, in some embodiments of the present invention, the memory controller 130 is configured to flush a buffer as soon as it is full. For example, after adding an entry to a buffer and updating the first write group table L1WGT to identify the new location of the tail, if the tail now identifies the location immediately before the head (e.g., (tail+1) % ring_buf_size==head), then the buffer is full. In this case, the flush(wgid) operation 600 may immediately be triggered to flush the full buffer to the non-volatile memory 120. In some embodiments of the present invention, the memory controller 130 periodically determines whether any of the buffers are full (e.g., (tail+1) % ring_buf_size==head) by iterating over the entries in the first write group table L1WGT and flushing associated buffers when a full buffer is found. In such embodiments of the present invention, a PWRITE command may cause the memory controller 130 to attempt to record a new entry to a buffer that is already full. If so, then the memory controller 130 may first flush the buffer (to empty the buffer) before recording the new write.

Extending the Write Group Table with L0WGT

In the embodiments described above, the buffer for each of the write groups was the same size. According to another embodiment of the present invention, in order to increase flexibility in the sizes of the buffers, zero or more rows of the second write group table L2WGT may be assigned to any given write group. As such, the number of the entries associated with any particular write group can be larger than the number of entries in any given row (e.g., 65 entries, as shown in FIG. 3B) of the second write group table L2WGT.

One embodiment of the present invention includes a third write group table L0WGT. In one embodiment of the present invention, the third write group table L0WGT is stored in static random access memory (SRAM) to provide faster access. The zeroth third write group table L0WGT is indexed by write group ID (wgid). Each write group ID is associated with a bitmap, which indicates which rows of the first and/or second write group tables L1WGT and L2WGT are mapped to that WGID.

Figure 9:
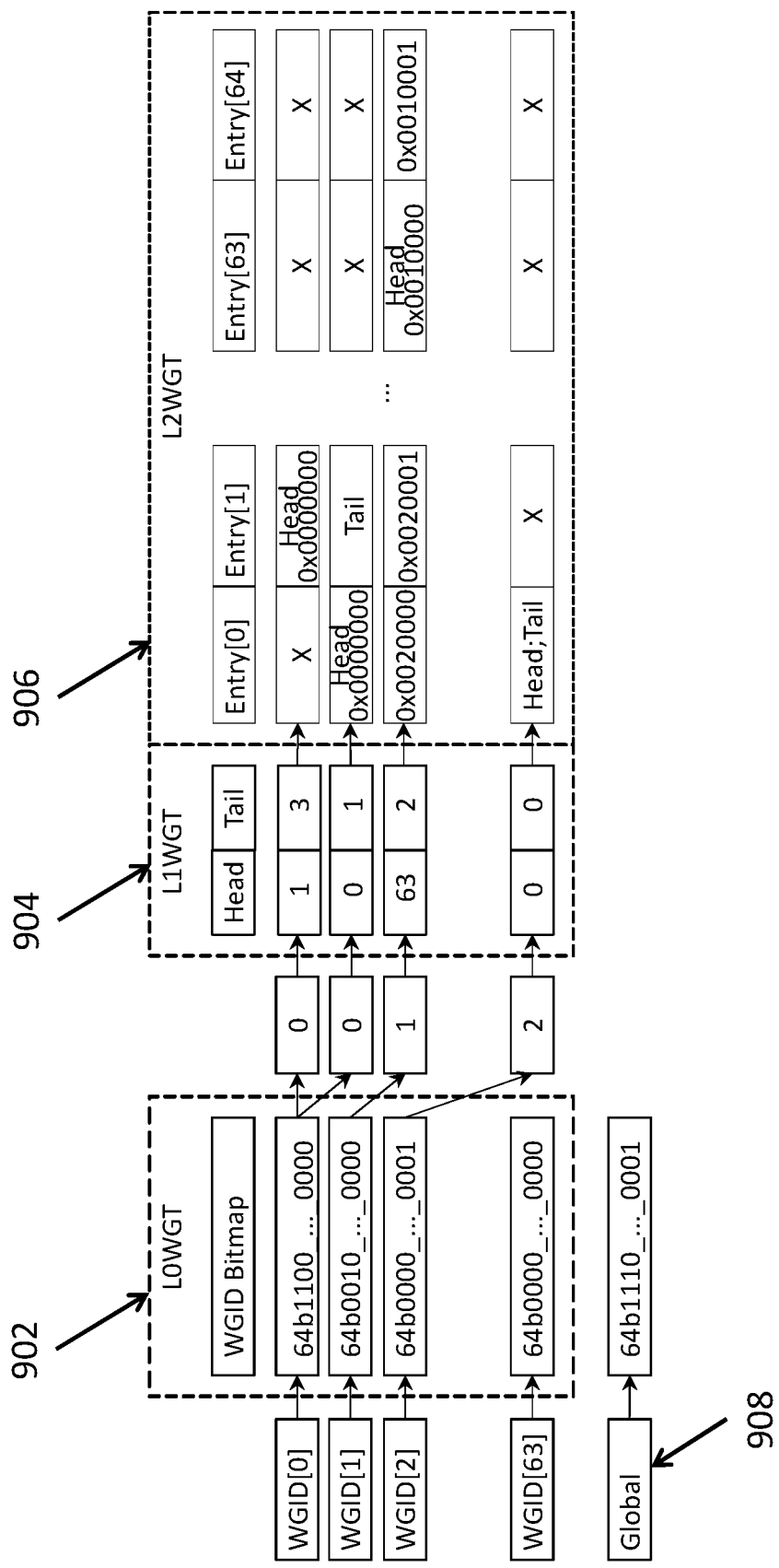
FIG. 9 is a schematic illustration of a third write group table, a first write group table, and a second write group table according to one embodiment of the present invention.

FIG. 9 is a schematic illustration of a third write group table 902, a first write group table 904, and a second write group table 906 according to one embodiment of the present invention. For example, each position in the bitmap corresponds to a different row of the first and second write group tables L1WGT and L2WGT. In the example shown in FIG. 9, WGID[0] is associated with the bitmap 64b1100_ . . . _ 000 (the indicates intervening bits that are set to zero), where the two 1s in the zeroth and first positions indicates that rows 0 and 1 are mapped to WGID[0]. As another example, WGID[1] is associated with the bitmap 64b0010_ . . . _0000, indicating that row 2 is mapped to WGID[1]. As a third example, WGID[2] is associated with the bitmap 64b0000_ . . . _0001, indicating that the last row (row 63) is mapped to WGID[2]. As a fourth example, WGID[63] is associated with the bitmap 64b0000_ . . . _0000, indicating that none of the rows is mapped to WGID[63].

In one embodiment of the present invention, each row of the first and second write group tables is mapped to at most one write group (e.g., each row is mapped to exactly zero or exactly one write group, and no row is mapped to more than one write group). In order to track which rows of the first and second write group tables L1WGT and L2WGT are in use, in one embodiment, a global bitmap 908 is used to track which rows of the first and second write group tables 904 and 906 are assigned to a write group by setting the corresponding positions of the global bitmap 908 to 1. Rows that are not assigned to a write group have the corresponding positions of the global bitmap set to 0. In the example shown in FIG. 9, because the zeroth and first rows are assigned to WGID[0], the second row is assigned to WGID[1] and the sixty third row is assigned to WGID[2], the global bitmap has the form 64b1110_ . . . _0001, which is also the bitwise XOR or sum of all of the individual bitmaps.

Some aspects of embodiments of the present invention relate to modified versions of the record and flush operations that are adapted to use the third write group table L0WGT as shown in FIG. 9.

In more detail, when including a third write group table 902, the record function first accesses the third write group table L0WGT to find the ring buffers that are mapped to that WGID. The head and tail of each such ring buffer can be checked to find a buffer that has available space. If all of the allocated buffers are full, then an additional buffer can be allocated to that WGID (e.g., by looking for an unassigned row in the global bitmap), and by updating the third write group table, including the bitmap associated with the WGID and the global bitmap, to indicate the assignment of that row to the WGID.

Figure 10:
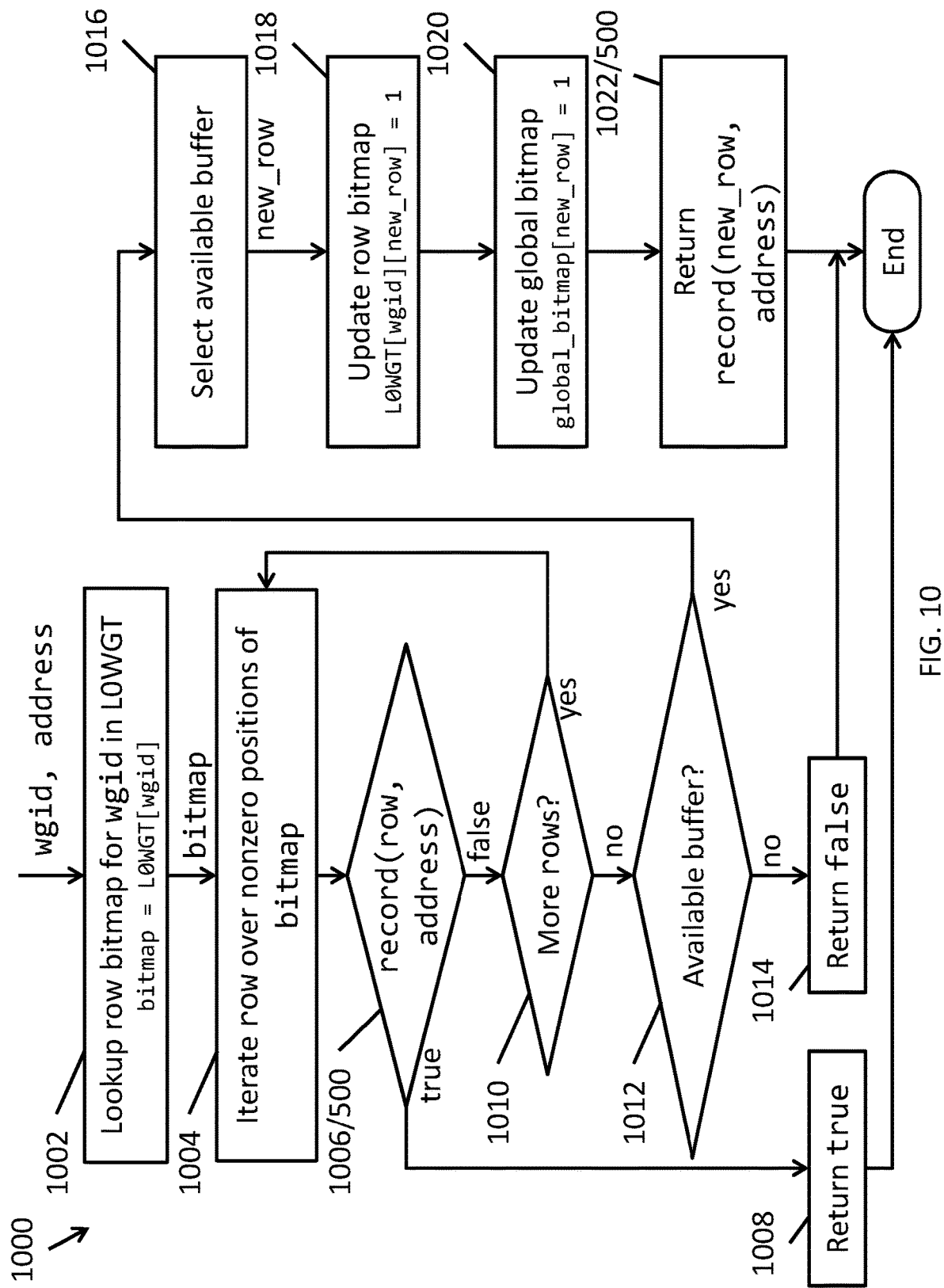
FIG. 10 is a flowchart of the implementation of a "record" operation in a system including a third write group table, a first write group table, and a second write group table according to one embodiment of the present invention.

FIG. 10 is a flowchart of the implementation of a "record" operation in a system including a third write group table, a first write group table, and a second write group table according to one embodiment of the present invention. As shown in FIG. 10, the record operation may still take as a write group ID wgid and an address as parameters. In operation 1002, the memory controller 130 looks up the row bitmap corresponding to the given wgid in the third write group table L0WGT. In operation 1004, the memory controller 130 begins a loop to iterate over the rows of the first and second write group tables that are assigned to the write group, as identified by the non-zero positions of the bitmap. In operation 1006, the memory controller 130 attempts to record the given address into the current row of the assigned rows using a record function substantially the same as the record function 500 described above with respect to FIG. 5, but adapted to take a row number instead of a write group. As seen in FIG. 5, the record function 500 returns a Boolean value (e.g., true or false), where true indicates success of the record operation and false indicates failure of the record operation. If the record operation succeeded (e.g., the address was recorded in the current row), then no further action is needed and the memory controller 130 returns true in operation 1008, indicating success of the record operation.

However, if the record operation fails (e.g., because the row is full), then the memory controller 130 determines, in operation 1010, whether there are more assigned rows to consider. If so, then the memory controller 130 loops back to operation 1004 to select the next row and to try to record again. As such, the record function 500 determines if one of the buffers of the second write group table L2WGT associated to the specified write group identifier WGID has available space for the given address and, in response to determining that one of the buffers has available space, records (stores) the given address in the identified buffer.

However, if there are no more assigned rows to try, (e.g., if all of the assigned rows are full or if there are no assigned rows) then the memory controller determines that none of the assigned rows has available space. As such, in operation 1012, the memory controller 130 determines whether there are any unassigned rows by checking the global bitmap. If not, then the record operation has failed and the memory controller 130 returns false in operation 1014. However, if there is at least one available row (e.g., a row or buffer that is not yet assigned to any of the write groups, as identified by a 0 in the global bitmap), then in operation 1016 the memory controller 130 selects one of those available rows (e.g., the lowest numbered row or buffer) as the "new_row." In operation 1018, the memory controller 130 updates the row bitmap for the current write group by setting the bit corresponding to the selected row to 1, thereby assigning the selected row (the "new_row") to that write group. In operation 1020, the memory controller 130 marks the selected row as being in use by updating the position of the global bitmap corresponding to the selected row to 1. In operation 1022, the memory controller 130 then uses substantially the same record function 500 to record the address in the selected row and returns that result.

Similarly, when implementing the flush(wgid) function with a third write group table L0WGT, the memory controller 130 may first access L0WGT to find the buffers assigned to that WGID and iterate through the values stored in each of those buffers to perform the writeback operation for each value. In addition, the memory controller 130 may update the third write group table L0WGT when buffers are deallocated (e.g., when the buffers are emptied by the flush operation) to unassign the emptied rows of the write group table from write groups (e.g., by performing a bitwise XOR between the bitmap for the flushed WGID and the global map and by then setting all of the bits of the bitmap for the flushed WGID to 0).

Figure 11:
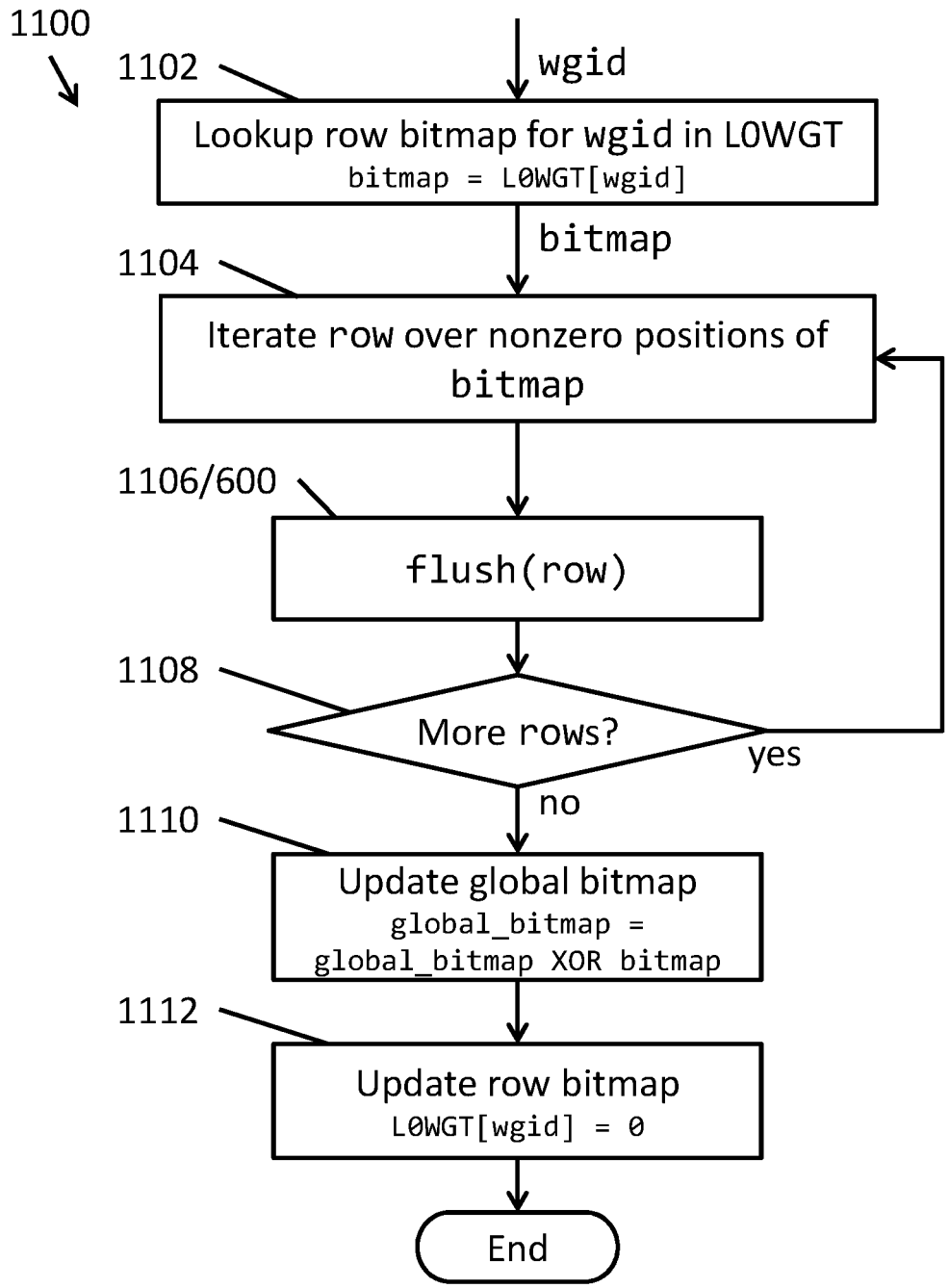
FIG. 11 is a flowchart of the implementation of a "flush" operation in a system including a third write group table, a first write group table, and a second write group table according to one embodiment of the present invention.

FIG. 11 is a flowchart of the implementation of a "flush" operation in a system including a third write group table, a first write group table, and a second write group table according to one embodiment of the present invention. In operation 1102, the memory controller 130 looks up the row bitmap corresponding to the given wgid in the third write group table L0WGT. In operation 1104, the memory controller 130 begins a loop to iterate over the rows of the first and second write group tables that are assigned to the write group, as identified by the non-zero positions of the bitmap. In operation 1106, the memory controller 130 performs a flush operation on the current row that is assigned to the write group, where the flush operation is a slightly modified version of the flush operation 600 shown in FIG. 6A, where the flush takes a row number rather than a write group ID as a parameter. In operation 1108, the memory controller 130 determines whether there are any additional rows to be processed. If so, then in the memory controller 130 loops back to operation 1104 to select the next row assigned to the write group. If not, then the memory controller updates the global bitmap to mark the rows that were previously assigned to the current write group as now being available. In operation 1112, the memory controller 130 also sets all of the bits of the row bitmap of the current write group to zero in the third write group table L0WGT to indicate that no rows are assigned to the current write group, after which the flush of the write group is complete.

As such, aspects of embodiments of the present invention are directed to systems and methods for associating data written to a NVDIMM-P module with a specified write group and improving the performance of flushing data from volatile memory to non-volatile memory in accordance with write group by avoiding the need to scan all of the volatile memory for data matching the given specified write group and by avoiding the redundant flushing of data to non-volatile memory if that data has already been written to non-volatile memory.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

While certain embodiments of the present invention have been illustrated and described, it is understood by those of ordinary skill in the art that certain modifications and changes can be made to the described embodiments without departing from the spirit and scope of the present invention as defined by the following claims, and equivalents thereof.

What is claimed is:

1. A memory module comprising:
a volatile memory;
a non-volatile memory; and
a memory controller comprising:
  a host layer;
  a media layer coupled to the non-volatile memory; and
  a logic core coupled to the host layer, the media layer, and the volatile memory, the logic core storing a first write group table comprising one or more rows, and the logic core being configured to:
    receive, via the host layer, a persistent write command comprising a cache line address, a persist flag indicating data is to be flushed to the non-volatile memory, and a write group identifier;
    receive, via the host layer, data associated with the persistent write command;
    write the data to the volatile memory at the cache line address;
    store the cache line address in a selected buffer of one or more buffers in a second write group table, the selected buffer corresponding to the write group identifier; and
    update a row of the first write group table to identify locations of the selected buffer containing valid entries, the row corresponding to the write group identifier,
  wherein the persist flag of the persistent write command is set, and the logic core is further configured to write the data and other data stored in the volatile memory to the non-volatile memory, the data and the other data being associated with the write group identifier.

2. The memory module of claim 1, wherein the logic core further stores a third write group table comprising one or more rows,
wherein a row of the rows of the third write group table is associated with a corresponding write group, and
wherein the row of the rows of the third write group table comprises a row bitmap identifying rows of the first write group table and the second write group table associated with the corresponding write group.

3. The memory module of claim 2, wherein the logic core is further configured to:
retrieve, from the third write group table, a corresponding row bitmap corresponding to the write group identifier, the corresponding row bitmap identifying buffers of the second write group table associated with the write group identifier;
determine, based on the corresponding row bitmap, that a buffer of the buffers associated with the write group identifier has available space; and
select the buffer as the selected buffer.

4. The memory module of claim 1
wherein the logic core is further configured to write the other data stored in the volatile memory to the non-volatile memory by:
retrieving one or more buffers in the second write group table associated with the write group identifier, a buffer of the buffers storing one or more cache line addresses; and for a cache line address of the one or more cache line addresses of the one or more buffers associated with the write group identifier, writing the data of the volatile memory at the cache line address of the one or more cache line addresses to the non-volatile memory.

5. The memory module of claim 1, further comprising cache metadata memory,
wherein the logic core is configured to store, in the cache metadata memory, a persist state for the cache line address stored in the second write group table.

6. The memory module of claim 5
wherein the logic core is further configured to:
determine that the persist flag is set;
retrieve one or more buffers associated with the write group identifier, a buffer of the buffers storing one or more cache line address; and
for a cache line address of the one or more cache line addresses of the one or more buffers associated with the write group identifier:
determine that the persist state corresponding to the cache line address is set; and
write the data at the cache line address of the volatile memory to the non-volatile memory based on the persist state.

7. The memory module of claim 1, wherein the memory module is a non-volatile dual in-line memory module.

8. The memory module of claim 2, wherein the logic core is further configured to:
retrieve, from the third write group table, a corresponding row bitmap corresponding to the write group identifier, the corresponding row bitmap identifying buffers of the second write group table associated with the write group identifier;
determine that there is an available buffer in the second write group table;
update the corresponding row bitmap to associate the available buffer with the write group identifier; and
select the available buffer as the selected buffer.

9. A method for operating a memory module comprising:
a volatile memory;
a non-volatile memory; and
a memory controller comprising:
a host layer;
a media layer coupled to the non-volatile memory; and
a logic core coupled to the host layer, the media layer, and the volatile memory, the logic core storing a first write group table comprising one or more rows, and the logic core being configured to control the volatile memory and the non-volatile memory,
the method comprising:
receiving, by the memory controller, a persistent write command comprising a cache line address, a persist flag indicating data is to be flushed to the non-volatile memory, and a write group identifier;
receiving, by the memory controller, data associated with the persistent write command;
writing the data to the volatile memory at the cache line address;
storing, by the memory controller, the cache line address in a selected buffer of one or more buffers in a second write group table, the selected buffer corresponding to the write group identifier; and
updating, by the memory controller, a row of the first write group table to identify locations of the selected buffer containing valid entries, the row corresponding to the write group identifier,
wherein the persist flag of the persistent write command is set and the method further comprises writing the data and other data stored in the volatile memory to the non-volatile memory, the data and the other data being associated with the write group identifier.

10. The method of claim 9, wherein the logic core further stores a third write group table comprising one or more rows,
wherein a row of the rows of the third write group table is associated with a corresponding write group, and
wherein the row of the rows of the third write group table comprises a row bitmap, the row bitmap identifying rows of the first write group table and the second write group table associated with the corresponding write group.

11. The method claim 10, further comprising:
retrieve, from the third write group table, a corresponding row bitmap corresponding to the write group identifier, the corresponding row bitmap identifying buffers of the second write group table associated with the write group identifier;
determining, based on the corresponding row bitmap, that a buffer of the buffers associated with the write group identifier has available space; and
selecting the buffer as the selected buffer.

12. The method of claim 9
wherein the method further comprises writing the other data to the non-volatile memory by:
retrieving one or more buffers in the second write group table associated with the write group identifier, a row of the buffers storing one or more cache line address; and
for the row of the one or more cache line addresses of the one or more buffers associated with the write group identifier, writing the data at the cache line address of the volatile memory to the non-volatile memory.

13. The method of claim 9, wherein the memory module further comprises cache metadata memory,
wherein the method further comprises storing, in the cache metadata memory, a persist state for a cache line address stored in the second write group table.

14. The method of claim 13
wherein the method further comprises:
determining that the persist flag is set;
retrieving one or more buffers associated with the write group identifier, a buffer of the buffers storing one or more cache line address; and
for a cache line address of the one or more cache line addresses of the one or more buffers associated with the write group identifier:
determining that the persist state corresponding to the cache line address is set; and
writing the data at the cache line address of the volatile memory to the non-volatile memory based on the persist state.

15. The method of claim 9, wherein the memory module is a non-volatile dual in-line memory module.

16. The method of claim 10, further comprising:
retrieving, from the third write group table, a corresponding row bitmap corresponding to the write group identifier, the corresponding row bitmap identifying buffers of the second write group table associated with the write group identifier;
determining that there is an available buffer in the second write group table;

updating the corresponding row bitmap to associate the available buffer with the write group identifier; and
selecting the available buffer as the selected buffer.

\* \* \* \* \*